United States Patent
Akiyama

(10) Patent No.: US 11,288,985 B2
(45) Date of Patent: Mar. 29, 2022

(54) ENCRYPTION DEVICE, DECRYPTION DEVICE, ENCRYPTION METHOD, DECRYPTION METHOD, ENCRYPTION PROGRAM PRODUCT, AND DECRYPTION PROGRAM PRODUCT

(71) Applicant: KABUSHIKI KAISHA TOSHIBA, Minato-ku (JP)

(72) Inventor: Koichiro Akiyama, Setagaya (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 58 days.

(21) Appl. No.: 17/004,211

(22) Filed: Aug. 27, 2020

(65) Prior Publication Data

US 2021/0248928 A1 Aug. 12, 2021

(30) Foreign Application Priority Data

Feb. 7, 2020 (JP) .............................. JP2020-019948

(51) Int. Cl.
*H04L 9/30* (2006.01)
*G09C 1/00* (2006.01)

(52) U.S. Cl.
CPC .............. *G09C 1/00* (2013.01); *H04L 9/3026* (2013.01); *H04L 2209/08* (2013.01); *H04L 2209/12* (2013.01)

(58) Field of Classification Search
CPC ....... G09C 1/00; H04L 9/3026; H04L 9/0825; H04L 2209/08; H04L 2209/12
See application file for complete search history.

(56) References Cited

U.S. PATENT DOCUMENTS 7,773,747 B2 * 8/2010 Akiyama .............. H04L 9/3026
380/30
7,787,623 B2 * 8/2010 Akiyama .............. H04L 9/3026
380/44

(Continued)

FOREIGN PATENT DOCUMENTS

JP 2010-204466 A 9/2010

OTHER PUBLICATIONS

Takagi et al., The Multi-variable Modular Polynomial and Its Applications to Cryptography, Dec. 16, 1996, ISAAC, pp. 386-396 (Year: 1996).*

*Primary Examiner* — Lynn D Feild
*Assistant Examiner* — Abdullah Almamun
(74) *Attorney, Agent, or Firm* — Oblon, McClelland, Maier & Neustadt, L.L.P.

(57) ABSTRACT

An encryption device includes hardware processors to: acquire a public key including an identification polynomial f(t) and a multivariable indeterminate equation X having elements of a ring $F_p[t]/g(t)$ as coefficients; disperse and embed a message m as coefficients of plaintext polynomial factors $m_i$ having, as coefficients, polynomials with a limited degree among the elements of the ring; generate a plaintext polynomial M by multiplying the plaintext polynomial factors $m_i$; randomly generate a random polynomial r having as a coefficient an element of the ring; randomly generate a noise polynomial e having as coefficients polynomials with a limited degree among the elements of the ring; and generate a ciphertext by encryption processing of performing an operation including adding, subtracting, or multiplying the identification polynomial f(t), the random polynomial r, the noise polynomial e, and the multivariable indeterminate equation X to, from, or by the plaintext polynomial M.

7 Claims, 14 Drawing Sheets

(56) References Cited

U.S. PATENT DOCUMENTS

| | | | | |
|---|---|---|---|---|
| 8,522,033 B2* | 8/2013 | Sakumoto | H04L 9/3093 | 713/176 |
| 2002/0001383 A1* | 1/2002 | Kasahara | H04L 9/3093 | 380/30 |
| 2007/0061572 A1* | 3/2007 | Imai | H04L 9/3026 | 713/169 |
| 2007/0110232 A1* | 5/2007 | Akiyama | H04L 9/3026 | 380/30 |
| 2008/0019511 A1* | 1/2008 | Akiyama | G06F 7/724 | 380/30 |
| 2009/0185680 A1* | 7/2009 | Akiyama | H04L 9/3093 | 380/30 |
| 2010/0054480 A1* | 3/2010 | Schneider | H04L 9/085 | 380/283 |
| 2010/0226496 A1* | 9/2010 | Akiyama | H04L 9/3026 | 380/30 |
| 2010/0329447 A1* | 12/2010 | Akiyama | H04L 9/3093 | 380/28 |
| 2013/0089201 A1* | 4/2013 | Sakumoto | H04L 9/3093 | 380/44 |
| 2015/0172258 A1* | 6/2015 | Komano | H04L 9/008 | 380/259 |
| 2016/0119120 A1* | 4/2016 | Wang | H04L 9/0618 | 380/30 |
| 2018/0034630 A1* | 2/2018 | Rietman | H04L 9/0869 | |
| 2019/0312728 A1* | 10/2019 | Poeppelmann | H04L 9/0662 | |

* cited by examiner

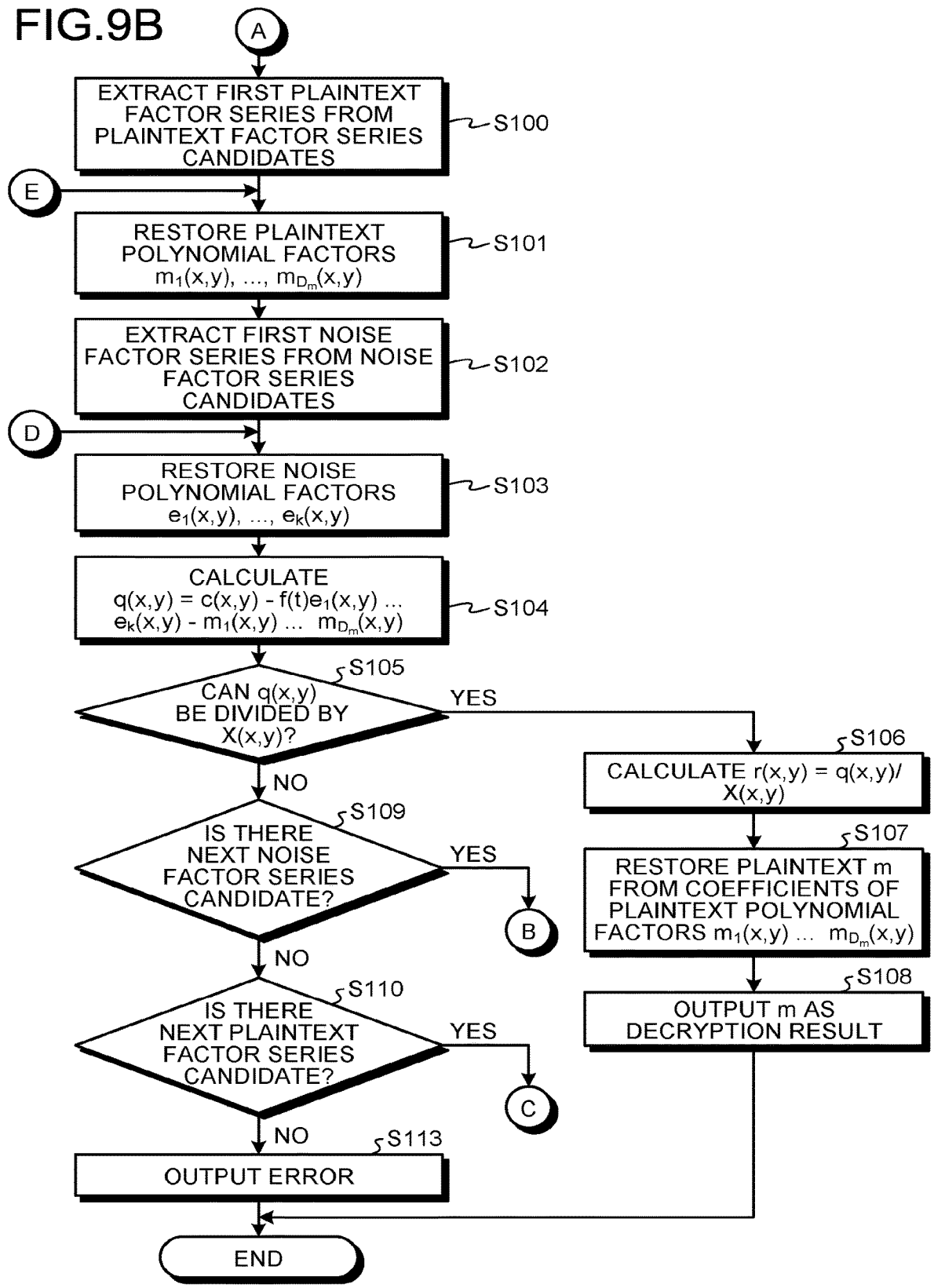

FIG.9C
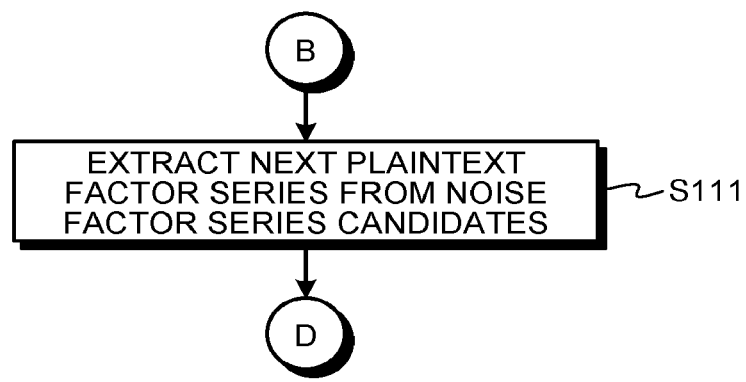
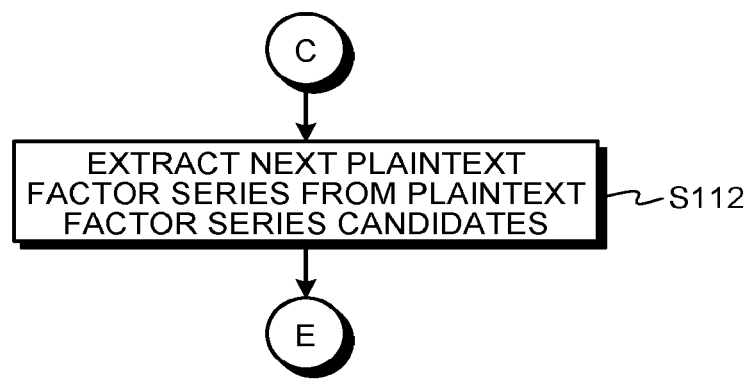

FIG.10

| FREE PARAMETER | | | SUBORDINATE PARAMETER | | NUMBER OF VARIABLES | | | | COMPARISON | NUMBER OF EQUATIONS |
|---|---|---|---|---|---|---|---|---|---|---|
| $D_x$ | $D_r$ | $d_m$ | $d_e$ | $d_s$ | $d_f$ | n | M | e | r | TOTAL NUMBER | | |
| 2 | 1 | 1 | 50 | 4 | 11 | 74 | 18 | 510 | 222 | 750 | > | 740 |
| 2 | 2 | 1 | 39 | 4 | 11 | 67 | 18 | 600 | 402 | 1020 | > | 1005 |
| 2 | 3 | 1 | 34 | 4 | 11 | 66 | 18 | 735 | 660 | 1413 | > | 1386 |
| 2 | 4 | 1 | 31 | 4 | 11 | 67 | 18 | 896 | 1005 | 1919 | > | 1876 |
| 2 | 5 | 1 | 29 | 4 | 11 | 69 | 18 | 1080 | 1449 | 2547 | > | 2484 |
| 2 | 6 | 1 | 27 | 4 | 11 | 71 | 18 | 1260 | 1988 | 3266 | > | 3195 |
| 2 | 7 | 1 | 26 | 4 | 11 | 74 | 18 | 1485 | 2664 | 4167 | > | 4070 |
| 2 | 8 | 1 | 25 | 4 | 11 | 77 | 18 | 1716 | 3465 | 5199 | > | 5082 |
| 2 | 9 | 1 | 24 | 4 | 11 | 80 | 18 | 1950 | 4400 | 6368 | > | 6240 |
| 2 | 10 | 1 | 24 | 4 | 11 | 84 | 18 | 2275 | 5544 | 7837 | > | 7644 |

FIG.11

| FREE PARAMETER | | | SUBORDINATE PARAMETER | | | NUMBER OF VARIABLES | | | | COMPARISON | NUMBER OF EQUATIONS |
|---|---|---|---|---|---|---|---|---|---|---|---|
| $D_x$ | $D_r$ | $d_m$ | $d_e$ | $d_s$ | $d_f$ | $n$ | $M$ | $e$ | $r$ | TOTAL NUMBER | |
| 2 | 1 | 1 | 50 | 4 | 11 | 74 | 9 | 204 | 148 | 361 | > | 296 |
| 2 | 2 | 1 | 39 | 4 | 11 | 67 | 9 | 200 | 201 | 410 | > | 335 |
| 2 | 3 | 1 | 34 | 4 | 11 | 66 | 9 | 210 | 264 | 483 | > | 396 |
| 2 | 4 | 1 | 31 | 4 | 11 | 67 | 9 | 224 | 335 | 568 | > | 469 |
| 2 | 5 | 1 | 29 | 4 | 11 | 69 | 9 | 240 | 414 | 663 | > | 552 |
| 2 | 6 | 1 | 27 | 4 | 11 | 71 | 9 | 252 | 497 | 758 | > | 639 |
| 2 | 7 | 1 | 26 | 4 | 11 | 74 | 9 | 270 | 592 | 871 | > | 740 |
| 2 | 8 | 1 | 25 | 4 | 11 | 77 | 9 | 286 | 693 | 988 | > | 847 |
| 2 | 9 | 1 | 24 | 4 | 11 | 80 | 9 | 300 | 800 | 1109 | > | 960 |
| 2 | 10 | 1 | 24 | 4 | 11 | 84 | 9 | 325 | 924 | 1258 | > | 1092 |

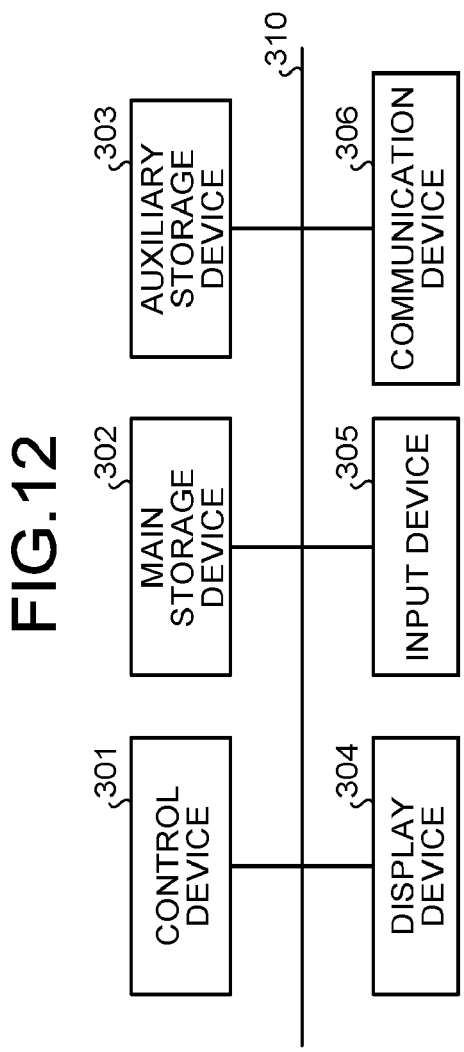

ENCRYPTION DEVICE, DECRYPTION DEVICE, ENCRYPTION METHOD, DECRYPTION METHOD, ENCRYPTION PROGRAM PRODUCT, AND DECRYPTION PROGRAM PRODUCT

CROSS-REFERENCE TO RELATED APPLICATIONS

This application is based upon and claims the benefit of priority from Japanese Patent Application No. 2020-019948, filed on Feb. 7, 2020; the entire contents of which are incorporated herein by reference.

FIELD

Embodiments described herein relate generally to an encryption device, a decryption device, an encryption method, a decryption method, an encryption program product, and a decryption program product.

BACKGROUND

Cryptography is a technique widely used for protecting the confidentiality and authenticity of information in a networked society in which people communicate with a large amount of information such as e-mails exchanged over a network. However, even the RSA cryptography and elliptic curve cryptography, which are currently widely accepted versions of the technique, cannot be free of a potential risk of decipherment by a practical quantum computer expected to appear in the near future.

BRIEF DESCRIPTION OF THE DRAWINGS

FIG. 9B is a flowchart illustrating an example of a decryption method according to a modification of the embodiment;

FIG. 9C is a flowchart illustrating an example of a decryption method according to a modification of the embodiment;

FIG. 10 is a diagram illustrating a first comparative example of the number of variables and the number of expressions in a linear algebraic attack;

FIG. 11 is a diagram illustrating a second comparative example of the number of variables and the number of expressions in a linear algebraic attack; and FIG. 12 is a diagram illustrating an example of the hardware configuration of the encryption device, the decryption device, and the key generation device of the embodiment.

DETAILED DESCRIPTION

Figure 1:
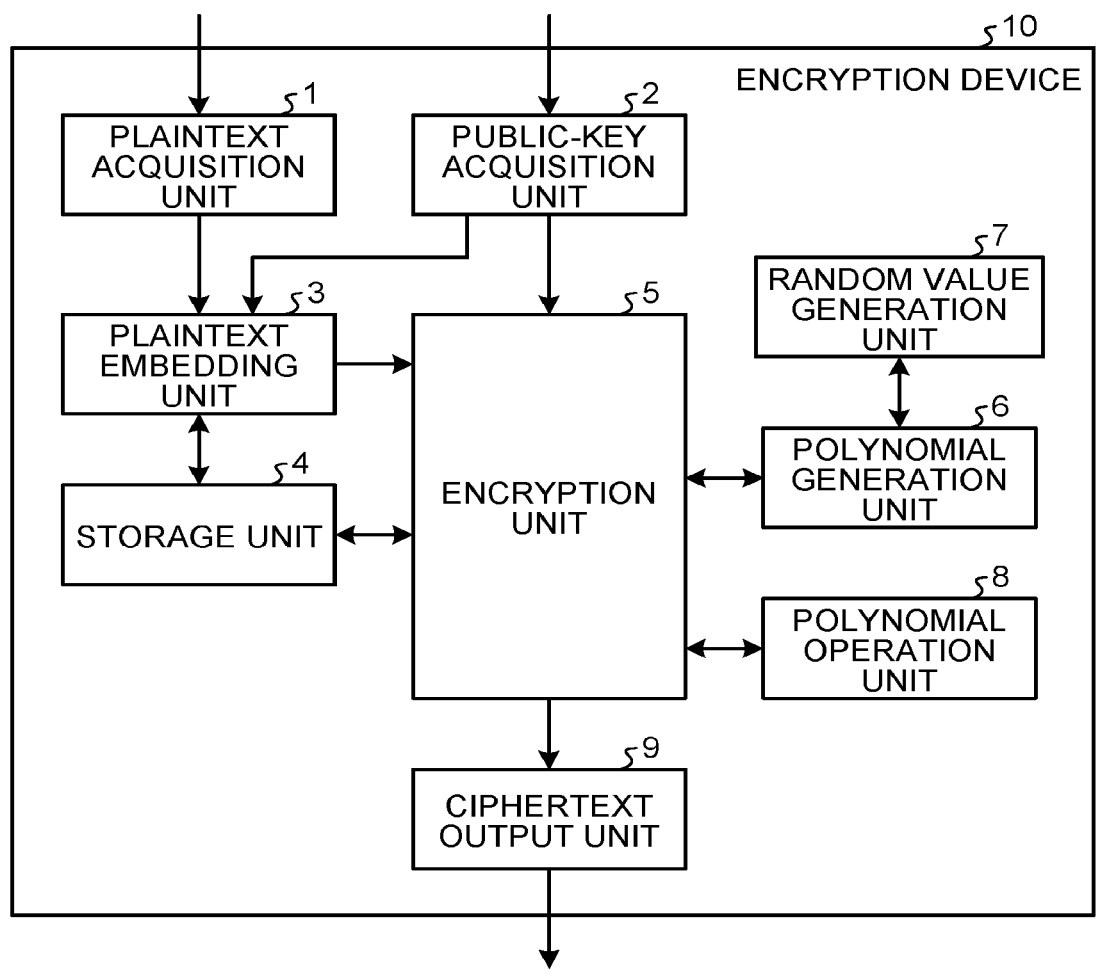
FIG. 1 is a diagram illustrating an example of a functional configuration of an encryption device of an embodiment.

An encryption device according to an embodiment includes one or more hardware processors configured to: acquire a public key including a multivariable indeterminate equation $X(x_1, \ldots, x_l)$ and an identification polynomial $f(t)$, the multivariable indeterminate equation $X(x_1, \ldots, x_l)$ having, as coefficients, elements of a ring $F_p[t]/g(t)$ (where $F_p[t]$ represents a univariate polynomial ring on a finite field $F_p$ and $g(t)$ represents a modular polynomial); disperse and embed a message m as coefficients of a plurality of plaintext polynomial factors $m_i(x_1, \ldots, x_l)$ ($i=1, \ldots, k$) having, as coefficients, polynomials with a limited degree among the elements of the ring $F_p[t]/g(t)$; generate a plaintext polynomial $M(x_1, \ldots, x_l)$ by multiplying the plaintext polynomial factors $m_i(x_1, \ldots, x_l)$ ($i=1, \ldots, k$); randomly generate a random polynomial $r(x_1, \ldots, x_l)$ having, as a coefficient, an element of the ring $F_p[t]/g(t)$; randomly generate a noise polynomial $e(x_1, \ldots, x_l)$ having, as coefficients, polynomials with a limited degree among the elements of the ring $F_p[t]/g(t)$; and generate a ciphertext $c(x_1, \ldots, x_l) = E_p k(M, f, r, e; X)$ by executing encryption processing of performing an operation including at least one of adding, subtracting, and multiplying the identification polynomial $f(t)$, the random polynomial $r(x_1, \ldots, x_l)$, the noise polynomial $e(x_1, \ldots, x_l)$, and the multivariable indeterminate equation $X(x_1, \ldots, x_l)$ to, from, or by the plaintext polynomial $M(x_1, \ldots, x_l)$.

Embodiments of an encryption device, a decryption device, an encryption method, a decryption method, an encryption program product, and a decryption program product will be described in detail below with reference to the accompanying drawings.

Cryptographic technology can be roughly divided into common-key cryptographic technology and public-key cryptographic technology. Common-key cryptography is a cryptographic method based on a data scrambling algorithm. The common-key cryptography enables high-speed encryption/decryption, whereas secret communication and authentication communication can only be performed between two parties each being given a common key in advance. Public-key cryptography is a cryptographic method based on a mathematical algorithm. The public-key cryptography is not as fast as encryption/decryption as common-key cryptography, but it does not require pre-key sharing. Public-key cryptography enables authentication communication by performing secret communication using the public key disclosed by the destination and applying a digital signature using the sender's private key (to prevent impersonation).

For this reason, common-key cryptography is mainly used to encrypt information that needs to be decrypted in real time after reception, such as pay digital broadcasting, and a method is adopted to deliver the decryption key separately used by a key distribution system called a conditional access system only to subscribers. By contrast, online sites on the Internet require encryption to protect customer information (credit card numbers, addresses, and the like) from eavesdropping, but it is not always possible to issue an encryption key in advance; and therefore, public-key cryptography is often used.

Typical examples of public-key cryptography include RSA cryptography and elliptic curve cryptography. In RSA cryptography, the difficulty of the prime factorization problem serves as the basis of security, and the power residue operation is used as the encryption operation. In elliptic curve cryptography, the difficulty of the discrete logarithm problem on an elliptic curve serves as the basis of security, and the point operation on the elliptic curve is used for the encryption operation. For these methods of public-key cryptography, although a attack method for a specific public key has been proposed, a general attack method is not known. Thus, attack methods for a serious problem regarding security have not been found so far except a attack method by a quantum computer described later.

Other examples of public-key cryptography include knapsack cryptosystem (known as NP problem) with the difficulty of the knapsack problem serving as the basis of security, and cryptosystems based on multivariate polynomials configured by using a field extension theory and with the solution problem of a system of equations serving as the basis of security. However, with respect to the knapsack cryptosystem, the attack method is already known in almost all instances, and it cannot be said that the security it provides is quite doubtful.

Although a powerful attack method is known for cryptosystems based on multivariate polynomials, there are also instances in which known attack methods do not work, and thus deterioration in security has become but not become decisive yet. However, the key size required to avoid known decryption methods has increased, which come to be seen as a problem.

The RSA cryptography and elliptic curve cryptography, which are currently widely accepted versions of the technique, cannot be free of a potential risk of decipherment by a practical quantum computer expected to appear in the near future. A quantum computer is a computer that can perform massively parallel computation (based on a principle different from the present computers) by utilizing a physical phenomenon called entanglement known in quantum mechanics. The quantum computer is a virtual computer the operation of which has been confirmed only at the experimental level so far, but research and development for its implementation are underway. In 1994, Shor showed that an algorithm for efficiently solving prime factorization and discrete logarithm problems can be constructed, using this quantum computer. That is, when the quantum computer becomes available, the RSA cryptography based on the prime factorization and the elliptic curve cryptography based on the discrete logarithm problem (on the elliptic curve) will be decrypted.

Under such circumstances, research on public-key cryptography, which has the possibility of maintaining safety even if a quantum computer becomes available, has been conducted in recent years. Lattice-based cryptography is an example of public-key cryptography that is still considered feasible at present and difficult to decipher even with a quantum computer. Lattice-based cryptography is a type of public-key cryptography the security of which is based on the problem of finding the closest point, among the points other than an original, to the origin (shortest vector problem) in the discrete n-dimensional vector space (linear space) called lattice.

The shortest vector problem is an NP-hard problem, but since it is a linear problem, small-sized problems can be easily solved. Therefore, the number of dimensions for achieving security is increased, and the key size of a public key, a private key, or the like is increased. Furthermore, public-key cryptography requires a larger circuit scale and takes a longer processing time than common-key cryptography, so that there is a problem in that it cannot be implemented in a low power environment, such as a mobile terminal, or it takes a long processing time even if it is implemented. For this reason, there is a demand for public-key cryptography that can be realized even in a low power environment.

In general, public-key cryptography is configured to find difficult-to-calculate problems (such as the prime factorization problem and discrete logarithm problem), and decipher a ciphertext (without knowing the private key) in such a way that is equivalent to solving the difficult-to-calculate problems. However, conversely, even if one problem that is difficult to calculate is defined, it is not always possible to easily construct public-key cryptography that uses that problem as the basis of security. This is because when the security is based on a problem that is too difficult to calculate, the problem of generating a key will also be difficult and cannot be configured. On the other hand, when the problem is made easy enough to enable key generation, deciphering the key will become easy accordingly.

Creativity is thus required to configure public-key cryptography in finding a difficult-to-calculate problems and changing it into a problem with a fine balance such that the problem is easy enough to generate a key but not easy to decipher (without knowing the generated private key). Since such a configuration is difficult to make, only several examples of public-key cryptography have been proposed so far. Under such circumstances, public-key cryptography (JP 2010-204466 A) is proposed, using an algebraic surface that cannot be efficiently deciphered even with a calculation by a quantum computer and that is expected to be processed at high speed even in a low power environment.

The public-key cryptography disclosed in JP 2010-204466-A has a private key as two sections corresponding to an algebraic surface $X(x,y,t)$ and a public key as the algebraic surface $X(x,y,t)$, and includes polynomial generation means and encryption means. The polynomial generation means performs processing of embedding a plaintext m in a plaintext polynomial $m(x,y,t)$ and generating a random polynomial $h(x,y,t)$, $s_1(x,y,t)$, $s_2(x,y,t)$, $r_1(x,y,t)$, $r_2(x,y,t)$ of three variables x, y, t. The encryption means generates two ciphertexts $c_1=E_{pk}(m,s_1,r_1,h,X)$, $c_2=E_{pk}(m,s_2,r_2,h,X)$ from the plaintext polynomial $m(x,y,t)$ through encryption processing of performing operation including at least one of addition, subtraction, and multiplication of each polynomial and a definition expression $X(x,y,t)$. The public-key cryptography disclosed in JP 2010-204466-A was deciphered since there were two ciphertexts without any noise term, although the ciphertexts had nonlinearity.

In the following, in view of such a current situation, an embodiment will explain public-key cryptography that has the possibility of ensuring security even if a practical quantum computer appears and that can eliminate vulnerability. Specifically, public-key cryptography that can eliminate vulnerability is constructed by hiding a private key in a nonlinear polynomial so that one ciphertext can have a nonlinear structure and adding noise.

Explanation of Algebra

First of all, the algebra used in the embodiment will be defined. To begin with, Z represents a set of integers, and $Z_q$ represents the coset of the integer Z corresponding to a natural number q. As a coset, $Z_q$ is generally expressed as $Z_q = \{[0], [1], \ldots, [q-1]\}$. The elements of $Z_q$ satisfy the following properties, so that operations of addition, subtraction, and multiplication can be defined.

$$[a]+[b]=[a+b]$$

$$[a]-[b]=[a-b]$$

$$[a]\cdot[b]=[ab]$$

A set is referred to as a ring, which enables the operations of addition, subtraction, and multiplication to be defined as described above and satisfies associativity. The ring includes additive identify 0 as well as an inverse element $[-x]$ that results in 0 when added to an element x other than 0.

The division operation can be defined only for $[b]$ with an element $[x]$ satisfying $[b][x]=[x][b]=[1]$. When such an element $[x]$ exists, the element $[x]$ is referred to as an inverse element of $[b]$ and is expressed as $[b^{-1}]$ Thus, the division $[a]/[b]$ for $[b]$ with the inverse element is calculated by multiplying $[a]$ by the inverse element $[b^{-1}]$ satisfying $[b]\cdot[b^{-1}]=[1]$ ($[a]\cdot[b^{-1}]$).

The element $[b]$ in $Z_q$ has the inverse element $[b^{-1}]$ under a necessary and sufficient condition $GCD(b,q)=1$. Specifically, the element $[b]$ in $Z_q$ has the inverse element $[b^{-1}]$ only when b and q are coprime (relatively prime). For example, when q is 5 and b is 3, these numbers are coprime, and thus the inverse element is obtained as $[3^{-1}]=[2]$. However, when q is 6, $GCD(3,6)=3$ holds, the numbers are not relatively prime, and thus the division cannot be defined due to the lack of the inverse element.

Meanwhile, [0] represents a set of numbers that can be divided by q without a remainder. It can be more explicitly expressed as $[0]=\{\ldots, -2q, -q, 0, q, 2q, \ldots\}$. All the elements of the set [0] results in the same answer in the calculation defined with $Z_q$. Thus, for the sake of simplicity, the calculation is assumed to be performed using a single element (representative element) in the set [0]. The representative element may be any element included in this set (due to the feature described above), and is set to be 0 in the embodiment. Similarly, the smallest integers in [1] and [2] (1 and 2, respectively) are used as the representative element, and $\{0, 1, \ldots, q-1\}$ is used as the representative for $Z_q$.

When q is a prime number, all representative elements other than 0 are coprime to q, whereby division can be defined. Thus, when q is a prime number, addition, subtraction, multiplication and division can be defined with $Z_q$. Such a set that is a commutative ring with elements other than 0 having inverse elements is known as a field. In particular, a field, such as $Z_q$ where q is a prime number, including a limited number of elements is referred to as a finite field. The finite field is either a field with the number of elements therein being a prime number or a field with the number of elements being a prime power, and the former is referred to as a prime field. Note that $Z_q$ mentioned herein is a prime field.

Next, the notation and definitions related to polynomials will be described. First of all, Z[t] represents a set of univariate polynomials, where an integer Z is a coefficient, and t is a polynomial variable. Furthermore, $Z_q[t]$ represents a set of polynomials, where a factor ring $Z_q$ is a coefficient. It should be quite obvious addition, subtraction, and multiplication can both be defined with Z[t] and $Z_q[t]$. However, division of polynomials cannot be defined, except for the polynomials including constant terms only, due to the lack of inverse element.

Next, explanation will be given on a coset in a case where a polynomial ring $Z_q[t]$ is divided by a polynomial $t^n-1$. For example, when n=3 and q=5, $t^3$ is congruent with 1 (the same element in the coset). Thus, an element with a degree not larger than n−1, which can be expressed by $t^3+2t^2+4t+2=2t^2+4t+3$, can be obtained. Generally, a coset represented by terms with a degree not larger than n−1 only is obtained (because to is congruent with 1). A univariate polynomial with a residue such as $t^n-1$ is referred to as a modular polynomial.

Specifically, with the modlar polynomial $t^3-1$, the addition and subtraction are performed as follows.

$$(t^2+3t+4)+(3t^2+3t+2)=4t^2+t+1$$

$$(t^2+3t+4)-(3t^2+3t+2)=3t^2+2$$

The multiplication is performed as follows.

$$(t^2 + 3t + 4) \cdot (3t^2 + 3t + 2) =$$
$$3t^4 + 12t^3 + 23t^2 + 18t + 8 = 3t^4 + 2t^3 + 3t^2 + 3t + 3 = 3t^2 + t$$

It can be seen that the normal $Z_q[t]$ is performed and then congruence between $t^3$ and 1 is reflected. Furthermore, multiplication and addition (or subtraction) can be combined as follows.

$$(t^2 + 3t + 4) \cdot (3t^2 + 3t + 2) + (4t^2 + 3t + 1) =$$
$$(3t^2 + t) + (4t^2 + 3t + 1) = 2t^2 + 4t + 1$$

This set is expressed as $Z_q[t]/(t^n-1)$ and abbreviated as $R_{q,n}$. Note that $R_{q,n}$ is a ring and enables the division to be defined (an element f(t) in $R_{q,n}$ may have an inverse element) depending on the elements, that is, under a necessary and sufficient condition $GCD(f(t),t^n-1)=1$ For example, when $R_{5,3}$ $(=Z_5[t]/(t^3-1))$ is given, $(t^2+t+2)$ and $(t^3-1)$ are coprime, enabling calculation $(t^2+2t+3)^{-1}=2t^2+4$ by using the extended Euclidean algorithm. Thus, based on the formula $(t^2+2t+3)(2t^2+4)=1$, $(2t^2+4)$ can be confirmed as the inverse element of $(t^2+2t+3)$. Meanwhile, $t^2-1$ has a common factor $t-1$ with $t^3-1$, and thus has no inverse element.

When a modular polynomial g(t) is an irreducible polynomial on $F_q$, the inverse element of the elements other than 0 in $R_{q,n}$ can be calculated, whereby a field is obtained. This field is referred to as an extension field of the finite field $F_p$ and is a finite field with $p^n$ elements. The original finite field $F_p$ has p elements and is referred to as a prime field.

In the embodiment, the ring $R_{p,n}$ and a bivariate polynomial ring $R_{p,n}[x,y]$ on the ring $R_{p,n}$, the finite field $F_p$, and a univariate polynomial ring $F_p[t]$ on $F_p$ are mainly used as the algebra. In addition, a subset of the ring $R_{p,n}$ is defined by the following Formula (1) as a polynomial coefficient.

$$R_{p,d}=\{\mu(t) \in R_{p,n} | \deg \mu(t) \leq d\} \quad (1)$$

It should be noted that $R_{p,d}$ itself does not form a ring, $R_{p,n}$ is substantially expressed by the following Formula (2), and the degree is substantially n−1.

$$R_{p,n}=\{\mu(t) | \deg R_{p,n} | \mu(t) \leq n-1\} \quad (2)$$

Notation of Bivariate Polynomial

Next, terms and symbols for bivariate polynomials will be defined. First of all, a bivariate polynomial on the ring R is expressed by the following Formula (3).

$$\xi(x, y) = \sum_{(i,j) \in \Gamma_\xi} \tau_{i,j} x^i y^j \quad (3)$$

In Formula (3), $\tau_{i,j}$ is an element of the ring R. A set $\Gamma_\xi$ is a set of x and y exponents (i,j) of non-zero monomial expressions in a polynomial $\xi(x,y)$, and is referred to as a term set of the bivariate polynomial $\xi(x,y)$.

For example, a term set of the polynomial on $Z_7$ in the following Formula (4) is expressed by the following Formula (5).

$$\zeta(x,y)=5x^3y^2+3x^2y^3+xy^2+4x+1 \quad (4)$$

$$\Gamma_\xi=\{(3,2),(2,3),(1,2),(1,0),(0,0)\} \quad (5)$$

The number of elements of $\Gamma_\xi$ matches the number of monomials of the bivariate polynomial $\xi(x,y)$. In the following, $\xi(x,y)$ that is clearly a bivariate polynomial may be simply written as $\xi$.

The product $\gamma_{\xi,\eta}$ of two term sets $\Gamma_\xi$ and $\Gamma_\eta$ is defined as in the following Formula (6).

$$\Gamma_{\xi\eta}=\{(i_1+i_2,j_1+j_2)|(i_1,j_1) \in \Gamma_\xi,(i_2,j_2) \in \Gamma_\eta\} \quad (6)$$

This means the term set of the polynomial $\xi(x,y)\eta(x,y)$. When a term set $\Gamma$ is given, a set of bivariate polynomials on the ring R including this term set is defined as in the following Formula (7). The sign on the left side of Formula (7) represents the bivariate polynomial on the ring R.

$$\mathscr{F}_\Gamma/R = \left\{ f \in R[x, y] | f = \sum_{(i,j) \in \Gamma} a_{i,j} x^i y^j \right\} \quad (7)$$

Note that the sign/R on the left side of Formula (7) may be omitted when the coefficient ring R is explicit.

Indeterminate Equation and its Solution Problem

An indeterminate equation can be defined as an equation with the number of variables being larger than the number of expressions (included in the equation). The indeterminate equations feature a small number of constraints and a high degree of freedom of solution, and thus in many cases yield a plurality of (in some cases, like its name, indeterminate number of) solutions if any. In fact, the indeterminate equations with an integer coefficient yield innumerable real (or complex) solutions, some of which can be easily obtained as an approximate solution. Unfortunately, this does not usually work for equations that solution of which is in a discrete set such as an integer solution of an indeterminate equation with an integer coefficient, or a solution (on a finite field) of an indeterminate equation on a finite field. Therefore, some theoretical means for narrowing down is required. However, it has been known that generally, whether there is a solution cannot be determined with such means for narrowing down performed for a limited number of times (unsolvable problem).

An indeterminate equation cryptosystem proposed in the embodiment has the following definitions, based on the fact that a solution problem for an indeterminate equation X(x,y)=0 defined on the univariate polynomial ring F[t] has been proven to be one of the unsolvable problems.

Definition 1 (Solution problem for indeterminate equation on univariate polynomial ring $F_p[t]$)

A problem of obtaining a solution $u_x(t)$, $u_y(t)$ on $F_p[t]$ when the indeterminate equation X(x,y)=0 defined on the univariate polynomial ring $F_p[t]$ is given is referred to as a solution problem for an indeterminate equation on the univariate polynomial $F_p[t]$.

This problem is one of the unsolvable problems for which an absence of a general solution algorithm has been proven.

In the following embodiment, a key generation algorithm and an encryption/decryption algorithm for the indeterminate equation cryptosystem will be described. In the system, plaintexts are distributed and embedded in factors $m_i(x,y)$ (i=1, ... k) of a bivariate polynomial m(x,y) on $F_p[t]$ referred to as a plaintext polynomial. Specifically, in the system, the plaintext polynomial is composed of a product structure (nonlinear structure) expressed by the following Formula (8).

$$m(x, y) = \prod_{i=1}^{k} m_i(x, y) \quad (8)$$

With the product structure (nonlinear structure) of the above Formula (8), in the decryption, the plaintexts cannot be restored until the factor $m_i(x,y)$ (i=1, ..., k) is obtained through factorization after m(x,y) has been restored. In the following, for the sake of simplicity, the degree of x,y of $m_i(x,y)$ is set to be 1, and an explanation is given only on a plaintext polynomial with a factor only including polynomials that can be expressed as $m_i(x,y)=m_{x,i}(t)x+m_{y,i}(t)y+m_{1,i}(t)$.

Furthermore, the following algorithms are provided with example numerical values of a small size. It should be noted that values of a small size are used for the sake of understanding, and the safety of the encryption cannot be guaranteed with such values.

System Parameter

System parameters, which include the following parameters 1. to 8. used in the algorithms, are for guaranteeing security and decryptability.

1. Term set $\Gamma_X$ of a (nonlinear) indeterminate equation X(x,y) expressed by the following Formula (9)

$$X(x, y) = \sum_{(i,j) \in \Gamma_X} \tau_{ij} x^i y^j \quad (9)$$

In Formula (9), $\Gamma_X$ includes (0,0).

Example: $\Gamma_X=\{(2,0),(1,1),(0,2),(1,0),(0,1),(0,0)\}$

2. Random polynomial term set $\Gamma_r$ expressed by the following Formula (10)

$$r(x, y) = \sum_{(i,j) \in \Gamma_r} r_{ij} x^i y^j \quad (10)$$

In Formula (10), $\Gamma_r$ includes (0,0).

Example: $\Gamma_r=\{(1,0),(0,1),(0,0)\}$

Furthermore, parameters expressed by the following Formulae (11) to (13) are derived from $\Gamma_X$ and $\Gamma_r$.

$$D_K=\max\{i+j|(i,j) \in \Gamma_X\} \quad (11)$$

$$D_r=\max\{i+j|(i,j) \in \Gamma_r\} \quad (12)$$

$$D_e=\max\{i+j|(i,j) \in \Gamma_{Xr}\} \quad (13)$$

In this example, $D_X$ is 2, $D_r$ is 1, and $D_c$ is 3. These $D_X$ and $D_r$ respectively represent the total degrees of the indeterminate equation X and a random polynomial r. When $D_X$ is equal to or larger than 2 as in this embodiment, a nonlinear indeterminate equation is obtained.

3. Prime number p indicating the size of the prime field $F_p$

Example: $p=7$

4. Maximum value $d_m$ of the degree of each coefficient included in a plaintext polynomial factor $m_i(x,y)$ (i=1, ..., k)

As described above, the plaintext polynomial factor can be expressed as $m_i(x,y)=m_{x,i}(t)x+m_{y,i}(t)y+m_{1,i}(t)$, whereby $d_s$ is expressed as in the following Formula (14).

$$d_s \geq \max_{i=1}^{D_m} \{\deg m_{x,i}(t), \deg m_{y,i}(t), \deg m_{1,i}(t)\} \quad (14)$$

In Formula (14), $D_m$ represents the number of plaintext polynomial factors.

Example: $d_m=1, D_m=2$

5. Maximum value $d_e$ of the degree of the coefficients included in a noise polynomial e(x,y)

Example: $d_e=2$

6. Degree $d_s$ of the indeterminate equation

Example: $d_s=4$

Note that $d_s=\deg u_x(t)=\deg u_y(t)$ holds. The following Formula (15) needs to be satisfied to enable decryption.

$$d_s \geq 2(d_m+1) \quad (15)$$

7, Degree $d_f$ of an identification polynomial f(t)

This $d_f$ satisfies the condition expressed by the following Formula (16) to enable decryption.

$$d_f > D_m(d_s+d_e) \quad (16)$$

Example: $d_f=11 > D_m(d_s+d_e)=10$

8. Degree n of the modular polynomial g(t) in $R_{p,n}(=F_p[t]/g(t))$

Note that g(t) does not necessarily be an irreducible polynomial on $F_p$. This n satisfies the condition expressed by the following Formula (17) to enable decryption.

$$n > d_f(D_X+D_r)d_s+d_e \quad (17)$$

Example: $n=27(>11+(2+1)\cdot 4+=24)$

The above-described p, $D_X$, Dr, $d_m$, and $d_e$ can be independently set, and the remaining $d_s$, $d_f$, and n can be determined in accordance with p, $D_X$, Dr, $d_m$, and $d_e$. Actually, $d_s$, $d_f$ and n are in subordination relationship based on the above-described Formulae (15) to (17), whereby $d_m < d_s \ll d_f \leq n$ holds.

Private Key

1. Minimum solution u of the indeterminate equation X expressed by the following Formula (18)

$$u:(x,y)=(u_x(t),u_y(t)), u_x(t), u_y(t) \in R_{p,d} \quad (18)$$

Example: The private key n is expressed by the following Formula (19) when $d_s=4$ and $p=7$.

$$(u_x(t), u_y(t))=(t^4+4t^3+5t^2t+4, 2t^4+5t^3+t^2+t+4) \quad (19)$$

Public Key

1. Indeterminate equation X(x,y) expressed by the following Formula (20)

$$X(x,y)=\Sigma_{(i,j) \in \Gamma_X} \tau_{ij} x^i y^j, \text{ where } \tau_{ij} \in R_{p,d_e} \quad (20)$$

Here, the solution of X=0 includes the private key u. Specifically, $X(u_x(t), u_y(t))=0$.

Key Generation

The following processing is executed by using the system parameters p, $d_s$, n, $\Gamma_X$, and $\Gamma_r$ as inputs.

Private Key Generation

The polynomials $u_x(t)$ and $u_y(t)$ of $F_p[t]$ are uniformly and randomly generated under the condition $\deg u_x(t)=\deg u_y(t)=d_s$.

Example: The polynomials $u_x(t)$ and $u_y(t)$ are expressed by Formula (19) described above when $p=7$ and $d_s=4$, for example.

Public Key Generation

1. Terms other than a constant term $a_{00}(t)$ are uniformly and randomly generated from the term set $\Gamma_X$ of the indeterminate equation. The specific generation method is as follows.

(a) X=0 (substitute X with an initial value 0)

(b) Perform the following for each element (i,j) (other than (0,0)) of $\Gamma_X$.

i. Uniformly and randomly generate a polynomial $a_{ij}(t)$ with the degree not larger than $d_s$ from $F_p[t]$.

ii. $X=X+a_{ij}(t)x^i y^j$ (substitute the expression on the right side into X)

Example: When $d_s=4$ and $\Gamma_X=\{(2,0),(1,1),(0,2),(1,0),(0,1),(0,0)\}$, the X(x,y) generated is expressed by the following Formula (21) for example.

$$X(x,y)=(5t^4+3t^2+2t^2 6t+6)x^2 \pm (2t^4+t^3+4t^2 3t+1)xy+(t^4+2t^3+t^2+3t+4)y^2+(5t^4+2t^3+3t+3)x+(2t^4+3t^3+2t^2+2t)y \quad (21)$$

2. The constant term $a_{00}(t)$ is calculated with the following Formula (22).

$$a_{00}(t) = - \sum_{(i,j) \in \Gamma_X - (0,0)} a_{ij}(t) u_x(t)^i u_y(t)^j \quad (\in R_{g,n}) \quad (22)$$

Example: In the above example, $a_{00}(t)$ is represented by the following Formula (23), and X is represented by the following Formula (24).

$$a_{00}(1)=6t^{12}+t^{11}+4t^{01}+t^8+6t^7+6t^6+4t^5+2t^4+5t^3+4t^2+2t+6 \quad (23)$$

$$(5t^4+3t^3+2t^2+6t+6)x^2+(2t^4+t^3+4t^2 3t+1)xy+(t^4+2t^3+t^2+3t+4)y^2+(5t^4+2t^3+3t+3)x+(2t^4+3t^3+2t^2+2t)y+6t^{12}+t^{11}+4t^{10}+t^8+6t^7+6t^6+4t^5+2t^4+5t^3+4t^2+2t+6 \quad (24)$$

3. The degree of the constant term $a_{00}(t)$ to $d_s$ or less.

The indeterminate equation X(x,y) has $(x,y)=(u_x(t), u_y(t))$ at the zero point. Thus, a polynomial X'(x,y)=X(x,y)−Y(x,y) resulting from addition/subtraction using another polynomial Y(x,y) with the same zero point, also has the same zero point. Therefore, $a_{00}(t)=Q(t)u_x(t)^2+R(t)(\deg R(t)<2d)$ holds, where Q(t) represents a quotient obtained by dividing $a_{00}(t)$ by $u_x(t)^2$ and R(t) represents the residue. Thus, $(x,y)=(u_x(t), u_y(t))$ is the solution of $-Q(t)x^2+a_{00}(t)-R(t)=0$. Thus, calculation of X'(x,y)=X(x,y)−Y(x,y) with $Y(x,y)=-Q(t)x^2+a_{00}(t)-R(t)$ results in $X'(x,y)=X(x,y)+Q(t)x^2-R(t)$ with $\deg a_{00}(t)>\deg R(t)$. Thus, a polynomial with a constant term having smaller degree is obtained. By repeating this by setting X'(x,y) to X(x,y) each time, $\deg a_{00}(t)$ becomes smaller than ds.

In the case of this example, X is expressed by the following Formula (25).

$$X=X(x,y)=(6t^4+t^3+2t^2+2t+3)x^2+(2t^4+t^3+4t^2+3t+1)xy+(t^4+2t^3+t^2+3t+4)y^2+(5t^4+3t^3+6t^2+5t+1)x+(2t^4+3t^3+2t^2 2t)y+4t^4+2t^3+3t+1 \quad (25)$$

With the degree of the polynomials serving as coefficients thus equalized, X(x,y) can be regarded as an element of $F_p[t]/(t^5-1)$.

Encryption

Next, the encryption processing according to the embodiment will be described.

Plaintext Embedding

In the embodiment, the plaintext polynomial for embedding the plaintext has the product structure as expressed in the above Formula (8), and thus direct embedding is not an option. Therefore, an encryption device of the embodiment disperses and embeds plaintext into plaintext polynomial factors $m_i(x,y)$ (i=1, ..., $D_m$). The factor $m_i(x,y)$ of the plaintext polynomial can be expressed as $m_i(x,y)=m_{x,i}(t)x+m_{y,i}(t)y+m_{1,i}(t)$ as described above. The degree of each of the coefficients $m_{x,i}(t)$, $m_{y,i}(t)$, and $m_{1,i}(t)$ is $d_m$. The encryption device of the embodiment performs p-adic expansion on a plaintext M as expressed by the following Formula (26).

$$M=(a_{d_m}, a_{d_m-1}, \ldots, a_1 a_0)_{(p)} \quad (26)$$

Here, the plaintext M is embedded as in the following Formula (27).

$$a_{d_m} t^{d_m} + a_{d_m-1} t^{d_m-1} + \ldots + a_1 t + a_0 \quad (27)$$

When p=7 and $d_m$=1 are given, the encryption device of the embodiment disperses and embeds a plaintext $(3,4,2,4,2,4)_{(7)}$ as a factor of a plaintext polynomial. For example, when $D_m$=2, the plaintext $(3,4,2,4,2,4)_{(7)}$ may be dispersed to result in $m_1=(1,4,2,3,6,4)_{(7)}$ and $m_2=(3,1,1,6,5,1)_{(7)}$. The plaintext is restored by obtaining the product mrm2=$(3,4,2,4,2,4)_{(7)}$ for each vector element. The plaintext may be dispersed to a plurality of elements in this manner as follows for example.

When dispersing a plaintext m to $m_1, \ldots,$ and $m_{Dm}$, the encryption device of the embodiment generates $m_1, \ldots, m_{Dm-1}$ as random data with the same size as the plaintext m, and generates mm as $m \cdot (m_1 \cdot m_2, \ldots, m_{Dm-1})^{-1}$. Here, $(m_1 \cdot m_2, \ldots, m_{Dm-1})^{-1}$ is defined as an array of multiplied inverse elements of the respective elements of vector Encryption Algorithm 1. The plaintext is dispersed and embedded to the factors $m_i(x,y)$ (i=1, ..., $D_m$) of the plaintext polynomial with the degree $d_m$ in the manner described above. The dispersion resulting in $m_1=(1,4,2,3,6,4)(7)$ and $m_2=(3,1,1,6,5,1)(7)$ is achieved by the following.

$$m1(x,y)=(t+4)x+(2t+3)y+6t+4$$

$$m2(x,y)=(3t+1)x+(t+6)y+5t+1$$

2. Generation of random polynomial r(x,y)

A bivariant random polynomial r(x,y) is generated from a random polynomial term set $\Gamma_r$. The specific generation method is as follows.

(a) r=0 (substitute initial value 0 for r)
(b) The following is executed for each (i,j) in $\Gamma_r$.
 i. A polynomial $r_{ij}(t)$ with the degree n-1 is uniformly and randomly generated from Rp,n.
 ii. $r=r+r_{ij}(t)x^i y^j$ (substitute the expression on the right side into r)

Example: When p=7, n=27, and $D_r$=1, the random polynomial r generated is expressed by the following Formula (28), for example.

$$r=(2t^{26}+5t^{25}+3t^{24}+2t^{23}+t^{22}+t^{21}+t^{20}+4t^{19}+5t^{17}+2t^{16}+ \\ 2t^{15}+6t^{14}+3t^{13}+t^{12}+2t^{10}+3t^9+4t^8+4t^7+3t^6+2t^5+ \\ 6t^4+t^3+t^2+4t+3)x+2t^{26}+4t^{25}+3t^{24}+5t^{23}+t^{22}+t^{21}+ \\ 3t^{20}+4t^{18}+4t^{17}+2t^{16}+3t^{13}+3t^{12}+5t^{11}+2t^{10}+5t^9+ \\ 5t^8+5t^7+5t^6+t^5+6t^4+4t^3+t^2+t2)y+2t^{26}+6t^{25}+3t^{24}+ \\ 3t^{23}+4t^{21}+3t^{20}+3t^{19}+6t^{18}+5t^{17}+3t^{16}+2t^{15}+4t^{14}+ \\ 4t^{13}+2t^{12}+6t^{11}+6t^{10}+2t^9+2t^8+4t^7+t^6+2t^5+3t^4+ \\ 6t^3+3t^2+2t+1 \quad (28)$$

3. Generation of noise polynomial e(x,y)

A noise polynomial e(x,y) is generated from the noise polynomial form $\Gamma_e$. The specific generation method is as follows.

(a) e=0 (substitute initial value 0 for e)
(b) The following is executed for each OD in $\Gamma_e$.
 i. Polynomial $e_{ij}(t)$ with the degree $d^e$ is uniformly and randomly generated from $R_{p,de}$.
 ii. $e=e+e_{ij}(t)x^i y^j$ (substitute the expression on the right side into e)

Example: When p=7, n=27, $D_r$=1, and $d_e$=2, the noise polynomial e generated is expressed by the following Formula (29), for example.

$$e=(3t^2+5t+3)x^3+(5t^2+5t)x^2 y+(2t^2+2t)xy^2+(4t^2+6t+6) \\ y^3+(t^2+5t+6)x^2+(t^2+2t)xy+(6t^2+5t+1)y^2+(6t^2+6t+ \\ 1)x+(2t^2+2t+1)y+3t^2+3t+3 \quad (29)$$

4. Generation of ciphertext c(x,y)

A ciphertext $c(x,y)=E_{pk}(M,f,r,e;X)$ is calculated with the following Formula (30).

$$c(x,y)=m_1(x,y)m_2(x,y) \ldots m_{D_m}(x,y)+X(x,y)r(x,y)+ \\ f(t) \cdot e(x,y) \quad (30)$$

Example: In this case, the ciphertext c is expressed by the following Formula (31).

$$c=(2t^{26}+4t^{25}+t^{23}+6t^{22}+3t^{21}+3t^{20}+t^{19}+3t^{18}+5t^{17}+3t^{16}+ \\ 4t^{15}+3t^{14}+2t^{13}+t^{12}+3t^{10}+6t^9+4t^8+5t^6+2t^5+2t^4+ \\ 5t^3+3t^2+3t+5)x^3+(t^{26}+4t^{25}+2t^{24}+6t^{23}+2t^{22}+6t^{19}+ \\ 5t^{18}+2t^{17}+t^{16}+2t^{15}+3t^{14}+4t^{13}6t^{10}+2t^9+4t^8+t^7+t^6+ \\ 3t^5+5t^3+2t+3)x^2 y+(t^{26}+3t^{24}+6t^{22}+6t^{21}+3t^{20}+t^{19}+ \\ 2t^{18}+3t^{17}+3t^{16}+3t^{14}+2t^{12}+t^{10}+4t^9+t^8+2t^7+6t^6+ \\ 5t^5+3t^4+3t^3+2t^2+3t+5)xy^2+(6t^{26}+5t^{25}+5t^{24}+2t^{23}+ \\ t^{42}+5t^{20}+6t^{19}+2t^{18}+4t^{17}+3t^{16}+3t^{14}+t^{13}+t^{12}+ \\ 5t^{11}+4t^9+4t^8+2t^7+2t^6+4t^5+2t^4+t^3+2t^2+6t+5)y^3+ \\ (6t^{26}+3t^{25}+6t^{24}+6t^{22}+t^{21}+6t^{20}+5t^{19}+t^{17}+t^{16}+t^{15}+ \\ 5t^{14}+5t^{11}+6t^{10}+6t^9+6t^8+2t^7+2t^6+4t^5+3t^4+4t^3+ \\ 3t^2+t+5)x^2+(2t^{25}+3t^{24}+t^{23}+3t^{22}+6t^{21}+4t^{20}+6t^{19}+ \\ 6t^{18}+4t^{17}+2t^{16}+5t^{15}+6t^{13}+3t^{12}+3t^{11}+t^{10}+5t^9+ \\ t^8+6t^7+t^6+5t^5+t^4+5t^3+6t^2+6t+3)xy+(3t^{26}+5t^{25}+ \\ 4t^{24}+3t^{23}+t^{22}+t^{21}+t^{20}+2t^{19}+6t^{18}+4t^{17}+5t^{16}+3t^{15}+ \\ 2t^{14}+2t^{13}+t^{12}+2t^{11}+4t^{10}+6t^9+4t^8+t^7+3t^6+2t^5+4t^3+ \\ 2t^2+4t)y^2+(6t^{26}+4t^{25}+3t^{23}+3t^{22}+4t^{21}+6t^{20}+6t^{19}+ \\ 4t^{18}+5t^{17}+3t^{14}+6t^{13}+6t^{12}+t^{11}+t^{10}+4t^9+4t^8+4t^7+ \\ 2t^6+t^5+5t^4+t^3+5t^2+6t+1)x+(4t^{26}+5t^{25}+6t^{24}+3t^{23}+ \\ 3t^{22}+3t^{21}+3t^{20}+t^{18}+5t^{17}+3t^{15}+2t^{13}+6t^{11}+2t^{10}+ \\ 6t^8+2t^7+5t^6+6t^5+2t^4+4t^3+5)y+3t^{26}+2t^{23}+2t^2+ \\ t^{21}+2t^{20}+t^{19}+6t^{17}+5t^{16}+2t^{15}+2t^{14}+3t^{13}+3t^{12}+t^{11}+ \\ t^{10}+5t^9+3t^8+t^7+4t^6+t^5+6t^4+t^5+6t^4+3t^3+2t^2+3t+2 \quad (31)$$

Decryption

Next, decryption processing of the embodiment will be described.

It is to be noted that substitution of minimum solution $u:(x,y)=(u_x(t),u_y(t))$ into the indeterminate equation X(x,y) results in $X(u_x(t),u_y(t))=0$.

Decryption Algorithm

The decryption algorithm is as follows.

1. Substitution of solution

The following Formulation (32) is calculated with the solution u substituted into c(x,y).

$$c(u_x(t),u_y(t)=m_1(u_x(t),u_y(t))m_2(u_x(t)) \ldots m_{D_m}(u_x(t),u_y \\ (t))+f(t) \cdot e(u_x(t),u_y(t)) \quad (32)$$

Here, $degc(u_x(t),u_y(t)) < n$ holds due to the condition for obtaining n (Formula (17) described above). This means that the result is the same regardless of whether $c(u_x(t),u_y(t))$ is an element of $R_{p,n}$ or an element of $F_p[t]$. Thus, in the following, $c(u_x(t),u_y(t))$ is regarded as an element of $F_p[t]$. In this example, this results in the following Formula (33).

$$c(u_x(t),u_y(t))=t^{25}+6t^{24}+2t^{23}+t^{22}+6t^{21}+6t^{20}+t^{19}+2t^{18}+\\2t^{16}+2t^{14}+t^{13}+6t^{11}+2t^{10}\cdot2t^9+3t^8+2t^7+t^6+5t^5+4t^4+\\3t^3+t^2+4t+1 \quad (33)$$

2. Product of plaintext polynomials $m_1(u_x(t),u_y(t))m_2(u_x(t), u_y(t)), \ldots, m_k(u_x(t),u_y(t))$ is obtained using $c(u_x(t),u_y(t))$ mod $f(t)$. This is because the condition (Formula (16) described above) guarantees the following Formula (34)

$$c(u_x(t),u_y(t))\bmod f(t)=m(u_x(t),u_y(t)) \quad (34)$$

In this example, the product of plaintext polynomials is expressed by the following Formula (35).

$$m(u_x(t),u_y(t))=4t^{10}+4t^9+5t^8+4t^7+t^6+6t^5+6t^4+4t^3+2t^2+\\4t+4 \quad (35)$$

3. Factorization of $m(u_x(t),u_y(t))$
In this example, this is implemented with the following Formula (36).

$$4(t+1)(t+4)(t^4+t^3+t^2+5)(t^4+2t^3+2t^2+6) \quad (36)$$

4. The plaintext polynomials are restored from the combination of factors obtained in step 3.

In this example, $(3t+5)x+(6t+2)y+4t+5$ is restored from the factor $(t+1)(t^4+t^3+t^2+5)$. Furthermore, $(2t+3)x+(3t+4)y+t+3$ is restored from the factor $(t+4)(t^4+2t^3+2t^2+2t+6)$. Thus, there are two combinations of factors and one of these needs to be designated.

Restoration of Plaintext Polynomial Factor

Next, an explanation will be given on how the factor combination is designated and how the restoration is performed. A method for restoring the plaintext polynomial factor $m_i(x,y)$ from $m_i(u_x(t),u_y(t))$ obtained in step 4 of the above decryption algorithm will be described. Here, for the sake of description, an algorithm for restoring the factor $m(x,y)$ of the plaintext polynomial from $m(u_x(t),u_y(t))$ without subscripts will be described.

It is assumed that a correct $m(u_x(t),u_y(t))$ (that is, one corresponding to the correct plaintext polynomial $m(x,y)$) is obtained. In this case, the plaintext polynomial is obtained by the following Formula (37).

$$m(x,y)=m_x(t)x+m_y(t)y+m_1(t) \quad (37)$$

Here, since $\deg m_x(t), \deg m_y(t), \deg m_1(t) \le d_m$ holds, this can be further expressed as in the following Formula (38).

$$m(x, y) = \left(\sum_{i=0}^{d_m} m_{x,i} t^i\right)x + \left(\sum_{i=0}^{d_m} m_{y,i} t^i\right)y + \sum_{i=0}^{d_m} m_{1,i} t^i \quad (38)$$

Thus, a formula obtained by substitution with the private key $(x,y)=(u_x(t),u_y(t))$ is substituted with $m_{x,i}, m_{y,i}, m_{1,i}$ ($i=0, \ldots, d_m$) serving as variables is compared with $m(u_x(t),u_y(t))$ (the following Formula (39)).

$$m(u_x(t), u_y(t)) = \left(\sum_{i=0}^{d_m} m_{x,i} t^i\right)u_x(t) + \left(\sum_{i=0}^{d_m} m_{y,i} t^i\right)u_y(t) + \sum_{i=0}^{d_m} m_{1,i} t^i \quad (39)$$

As described above, Formula (39) has the variable on the right side only and has no variable on the left side, whereby simultaneous equations are obtained through coefficient comparison between the right and left sides. Moreover, since the variables on the right side are not multiplied by each other, simultaneous linear equations are obtained. The plaintext polynomial can be restored by solving them.

It can be understood that the number of equations derived from Formula (39) described above is $d_s+d_m+1$, based on the fact that the number of variables is $3(d_m+1)$ and that the formula is a plaintext polynomial in the form expressed by Formula (37) described above. Considering the fact that the number of equations needs to be equal to or larger than the number of variables, $d_s \ge 2(d_m+1)$ needs to be satisfied to obtain a one single solution (the above Formula (15)). Here, a failure to obtain such a solution indicates that $m(u_x(t),u_y(t))$ is incorrect, and thus the factor is discarded.

Narrowing Down Plaintext Polynomial Factors

Next, using the example of the embodiment, a detailed description will be given on a method of extracting candidates of the factor $m(u_x(t),u_y(t))$ corresponding to the plaintext polynomial factor from factors obtained by factorizing $M(u_x(t),u_y(t))$ and narrowing down the candidates.

To begin with, the degree of the factor $m(u_x(t),u_y(t))$ is $d_s+d_m$ and thus is fifth degree, since $d_s=4$ and $d_m=1$ hold in this example. Furthermore, the factorization is as expressed by the following Formula (40), and thus the pair of factors is as expressed in one of the following Formulae (41) and (42).

$$m(u_x(t),u_y(t))=4(t+1)(t+4)(t^4+t^3+t^2+5)(t^4+2t^3+2t^2+2t+6) \quad (40)$$

$$2(t+4)(t^4+2t^3+2t^2+2t+6), 2(t+1)(t^4+t^3+t^2+5) \quad (41)$$

$$2(t+4)(t^4+t^3+t^2+5), 2(t+1)(t^4+2t^3+2t^2+2t+6) \quad (42)$$

Actual restoration of the plaintext using the above-described Formula (41) results in the following Formula (43). The following Formula (43) matches the quadruple of the plaintext polynomial factor used for the encryption.

$$(4t+6)x+(6t+1)y+2t+6,(6t+3)x+(5t+4)y+t+3 \quad (43)$$

On the other hand, restoration of the plaintext using the above-described Formula (42) results in the following Formula (44). The following Formula (44) does not match any constant multiple of the plaintext polynomial factor used for the encryption.

$$3x+(t+6)y+3t+4,(t+3)x+(4t+2)y+6t+6 \quad (44)$$

The actual restoration of the plaintext using the above-described Formula (43) results in (4,6,6,1,2,6) (6,3,5,4,1,3)= (3,4,2,4, 2,4) matching the original plaintext. On the other hand, the restoration of the plaintext using the above-described Formula (44) results in (0,3,1,6,3,4) (1,3,4,2,6,6)= (0,2,4,5,4,3) not matching the plaintext. For identifying these, the embodiment introduces an authenticator in plaintext.

The authenticator is originally used to confirm the validity of the message, but is used herein to identify the correct plaintext. There are various types of authenticators, but a simple example is used herein. Specifically, an authenticator $(a_5,a_6)=(a_1+a_3+4,a_2+a_4+3)$ is defined for a plaintext $(a_1,a_2, a_3,a_4)$ that uses an element of $F_7$, and is a part of a plaintext $(a_1,a_2,a_3,a_4,a_5,a_6)$.

Thus, the authenticator $((a_5,a_6))$ of the embodiment is calculated from the original encryption target data (the plaintext $(a_1,a_2,a_3,a_4)$) through a predetermined calculation. The message m includes the encryption target data (plaintext $(a_1,a_2,a_3,a_4)$) and the authenticator $((a_5,a_6))$.

When this authenticator is applied to this example, an authenticator for a plaintext (3,4,2,4) restored using the above-described Formula (43) is (2,4) which matches the authenticator (2,4) in the decryption result. On the other hand, the authenticator for plaintext (0,2,4,5) restored using the above-described Formula (44) is (1,3), which does not match the authenticator (4,3) in the decryption result. Thus, the plaintext (3,4,2,4,2,4) restored from the above Formula (43) is obtained as the decryption result.

In this example, a relatively simple combination is obtained because the degrees of the factors of $m(u_x(t),u_y(t))$ are each (1,1,4,4). When the degree of the factors is (1,1,2,2,2,2) for example, more complex combination is obtained. In such a case, an algorithm for solving a partial sum problem is used (but will not be described in detail herein). The partial sum problem is solved to obtain a partial sequence with which a certain number N is obtained by selecting from and adding up some elements in a sequence of natural numbers $a_1, a_2, \ldots, a_l$ with the length l. In this example, N is 5, and the solution of the problem is to obtain a partial sequence with the sum being 5 with no overlapping.

Here, there are factors corresponding to the respective numbers in the sequence (1,1,2,2,2,2), and thus to distinguish them, the elements are numbered to be [1,2,3,4,5,6]. For example, [1,3,4] corresponds to a sequence (1,2,2) a sum of which is 5. Furthermore, [2,5,6] also results in the sum of 5. A combination of these is one candidate. Furthermore, there is a combination of [2,3,6] paired with [1,4,5] corresponding to this. The partial sum problem is generally an NP-hard problem. Still, it has been known that problems of such a small size can be solved in a relatively short period of time.

Variation

In the following, some variations of the embodiment will be described.

Variation in Noise Polynomial

In the above-described embodiment, the noise polynomial has no constraint other than the constraint that the coefficient of a univariate polynomial, which is a coefficient, is limited to $d^e$, but as a variation, it may be expanded to a structure with the same product as the plaintext polynomial. Specifically, the noise polynomial is defined as in the following Formula (45).

$$e(x, y) = \prod_{i=1}^{k} e_i(x, y) \qquad (45)$$

In the case of the present embodiment, under the condition $d_s \geq 2(d_e+1)$, decryption can be implemented in a manner that is the same as that for restoring the plaintext, so that $e(x,y)$ is obtained. With this and the product $M(x,y)$ of the plaintext polynomial factor that has been obtained, $r(x,y)$ is obtained from the following Formula (46).

$$r(x,y)=(c(w,y)-f(t)e(x,y)-M(x,y))/X(x,y) \qquad (46)$$

Such a configuration actually provides many benefits. First of all, with the noise polynomial $e(x,y)$ restored in addition to the plaintext polynomial $M(x,y)$, combinations can be narrowed down to those enabling the division in the above-described Formula (46), even when each polynomial has ambiguity. In fact, $X(x,y)$ is a bivariate polynomial that is least likely to hold with a combination of incorrect $M(x,y)$ and $e(x,y)$ (this will result in a residue of a certain value), whereby decryption result candidates can be narrowed down. This means that the authenticator is not required.

Furthermore, with such a configuration, the plaintext can be also embedded in $e(x,y)$ and $r(x,y)$ randomly generated in the present embodiment. Furthermore, data of a large volume can be encrypted at once. Still furthermore, when the ciphertext is altered it is less likely to be decryptable, thus the configuration is also effective in terms of alteration detection.

Change of roles between plaintext polynomial and noise polynomial The ciphertext c in the above-described embodiment has the form of the following Formula (47).

$$c=\Pi_{i=1}^k m_i \pm Xr+f(t)e \qquad (47)$$

The roles may be changed between the first term and the third term of the above Formula (47) to obtain a form as in the following Formula (48).

$$c=f(t)\Pi_{i=1}^k m_i + Xr+e \qquad (48)$$

With the form of Formula (48) above, the plaintext polynomial can have a higher degree than the noise polynomial, meaning that a larger plaintext can be embedded with the degree of the plaintext polynomial factor increased. Specifically, when the degree of the plaintext polynomial factor is the first degree, data of $|3p(d_m+1)|$ bits can be embedded.

When the degree is the second degree, data of $|6p(d_m+1)|$ bits which is approximately the double can be embedded.

On the other hand, for decryption, simultaneous equations are obtained as expressed in the above-described Formula (39). The number of equations is $2d_s+d_m+1$ and the number of variables is $6(d_m+1)$. Thus, the condition of $d_s \geq 5(d_m+1)/2$ needs to be satisfied for obtained the solution.

Variation Regarding Encryption Operation

The ciphertext c in the above-described embodiment in the form of the above Formula (47) can have four types of variations with different combinations of signs (+ or −) of the random polynomial and the noise polynomial, as in the form expressed by the following Formula (49).

$$c=\Pi_{i=1}^k m_i \pm Xr \pm f(t)e \qquad (49)$$

In the case described in the embodiment, the random polynomial and the noise polynomial both have + signs. The decryption can be implemented as in the case in the embodiment also when the ciphertext c is generated with the other three types of variations.

Variation Regarding Variables

Throughout the embodiment, the explanation has been given on the bivariate polynomial on $R_{p,n}$. The encryption algorithm, the decryption algorithm, and the key generation algorithm as in the embodiment can also be obtained with other general l variables (multivariate polynomials). Even when the variables increase to be more than three, an indeterminate equation that solution problem for which is difficult to calculate is obtained as long as there is one indeterminate equation $X(x_1, \ldots, x_l)$. Generally, an increase in variables leads to a problem harder to solve, resulting in higher security. Thus, the increase enables the key size to be reduced, and also enables plaintext with a larger size to be embedded. Still, since there will be more coefficients to be restored, the system parameter needs to be changed to $d_s=1(d_m+1)$.

In the case of multivariable, in an encryption device 10, the public-key acquisition unit 2 acquires a public key including, for example, a multivariable indeterminate equation $X(x_1, \ldots, x_l)$ and an identification polynomial f(t). The multivariable indeterminate equation $X(x_1, \ldots, x_l)$ has, as coefficients, elements of a ring $F_p[t]/g(t)$ (where $F_p[t]$ represents a univariate polynomial ring on a finite field $F_p$ and g(t) represents a modular polynomial). A plaintext embedding unit 3 disperses and embeds a message m as coefficients of a plurality of plaintext polynomial factors $m_i(x_1, \ldots, x_l)=1, k)$ having, as coefficients, polynomials with a limited degree among the elements of the ring $F_p[t]/g(t)$. The polynomial operation unit 8 generates a plaintext polynomial $M(x_1, \ldots, x_l)$ resulting from multiplying the plaintext polynomial factors $m_i(x_1, \ldots, x_l)$ (i=1, k). The first polynomial generation unit randomly generates a random polynomial $r(x_1, \ldots, x_l)$ having, as a coefficient, an element of the ring $F_p[t]/g(t)$, whereas the second polynomial generation unit randomly generates a noise polynomial $e(x_1, \ldots, x_l)$ having, as coefficients, polynomials with a limited degree among the elements of the ring $F_p[t]/g(t)$. The first and second polynomial generation units may be implemented by one functional block like the above-mentioned polynomial generation unit 6, or may be implemented separately. The encryption unit 5 generates a ciphertext $c(x_1, \ldots, x_l)=E_{pk}(M,f,r,e;X)$ by executing encryption processing (corresponding to Formula (30) described above) of performing an operation including at least one of adding, subtracting, and multiplying the identification polynomial $f(t)$, the random polynomial $r(x_1, \ldots, x_l)$, the noise polynomial $e(x_1, \ldots, x_l)$, and the multivariable indeterminate equation $X(x_1, \ldots, x_l)$ to, from, or by the plaintext polynomial $M(x_1, \ldots, x_l)$.

In the case of being multivariable, in a decryption device 20, for example, a key acquisition unit 22 acquires a public key including an identification polynomial $f(t)$ and a multivariable indeterminate equation $X(x_1, \ldots, x_l)$ having, as coefficients, elements of a ring $F_p[t]/g(t)$ (where $F_p[t]$ represents a univariate polynomial ring on a finite field $F_p$ and $g(t)$ represents a modular polynomial), and acquires, as a private key, a zero point $u(x_1, \ldots, x_l)=(u_{x1}(t), \ldots, u_{xl}(t))$ of the multivariable indeterminate equation $X(x_1, \ldots, x_l)$. A zero-point substitution unit 24 substitutes the zero point u into a ciphertext $c(x_1, \ldots, x_l)$ to generate a univariate polynomial $h(t)$. A polynomial calculation unit 25 obtains a univariate polynomial $\mu(t)$ as a remainder of division of the univariate polynomial $h(t)$ by the identification polynomial $f(t)$. A factorization unit 26 acquires a first factor by factorizing the univariate polynomial $\mu(t)$ on the finite field $F_p$. A combination calculation unit 28 obtains, by combining the first factor, a second factor resulting from substituting the zero point u into a factor of a plaintext polynomial that is a product of a plurality of plaintext polynomial factors $m_i(x_1, \ldots, x_l)$ (i=1, \ldots, k) having, as coefficients, polynomials with a limited degree among elements of the ring $F_p[t]/g(t)$. A plaintext polynomial factor restoration unit 29 restores the plaintext polynomial factor $m_i(x_1, \ldots, x_l)$ by: deriving simultaneous linear equations by using the second factor and the zero point u; and solving the simultaneous linear equations. A decryption unit 23 extracts a plaintext vector from the plaintext polynomial factors $m(x_1, \ldots, x_l)$ and calculates a product of elements of the plaintext vector to decrypt a message m. A plaintext inspection unit 30 extracts an authenticator from the message m and verifies the authenticator. A plaintext output unit 31 outputs, as a decryption result, the message m for which the verification of the authenticator has succeeded.

Variation Regarding Coefficient of Indeterminate Equation

The coefficient of the indeterminate equation $X(x,y)$ that is the public key of the embodiment is selected from the polynomial set $R_p$, $d_s$ with $d_s$ (<n) representing the degree. This configuration is for making the degree of the coefficient of each term of the public key follow the reduction of the public key size which is one of tasks for achieving quantum-resistant cryptography. Still, in high-end applications where the public key size needs not to be limited, $R_{p,n}$ may be used for the sake of higher security. For lower-end application, the coefficient for terms other than the constant term may even be smaller. This configuration enables further reduction of the public key size and easier implementation.

The above variations (modifications) can be implemented independently from each other, and thus, some of or all these may be used in combination.

Specific Configurations

Next, specific configurations and operating methods of an encryption device, a decryption device, and a key generation device using public-key cryptography according to the present embodiment will be described.

First, the configuration and the flow of processing of the encryption device of the present embodiment will be described along the flowchart illustrated in FIG. 2 with reference to the overall configuration diagram illustrated in FIG. 1.

The encryption device 10 of the embodiment includes a plaintext acquisition unit 1, a public-key acquisition unit 2, a plaintext embedding unit 3, a storage unit 4, an encryption unit 5, a polynomial generation unit 6, a random value generation unit 7, a polynomial operation unit 8, and a ciphertext output unit 9.

Figure 2:
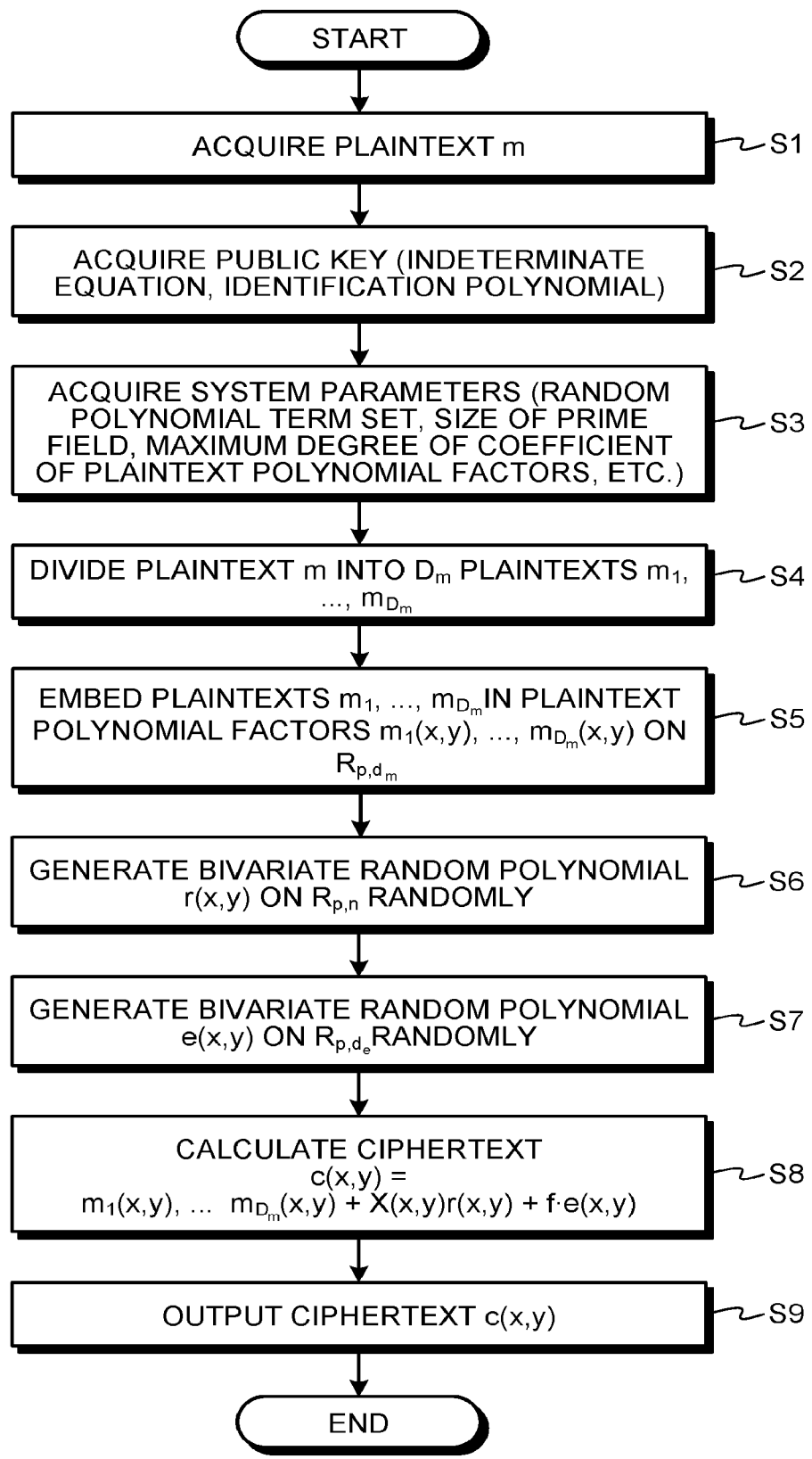
FIG. 2 is a flowchart illustrating an example of the encryption method of the embodiment.

As shown in FIG. 2, the plaintext acquisition unit 1 acquires a plaintext m (step S1). The plaintext acquisition unit 1 acquires, as a plaintext m, encryption target data acquired from another application or another device, for example. The plaintext acquisition unit 1 inputs the plaintext m into the plaintext embedding unit 3.

Next, the public-key acquisition unit 2 acquires a public key including a bivariate indeterminate equation $X(x,y)$ and an identification polynomial $f(t)$ (step S2). The public-key acquisition unit 2 acquires a public key from another device such as a key generation device described later.

Next, the plaintext embedding unit 3 acquires system parameters p, $D_m$, and $d_m$ from the storage unit 4 (step S3).

Subsequently, the plaintext embedding unit 3 divides the plaintext m input from the plaintext acquisition unit 1 into $3(d_m+1)$ sub-blocks of |p|−1 bits (|p| is the bit length of p). The plaintext embedding unit 3 divides each sub-block into $D_m$ plaintext fragments (step S4).

It should be noted that any division method may be used as long as it allows restoration when $D_m$ plaintext fragments are complete, and examples thereof include a method using a product for each element of a vector.

The plaintext embedding unit 3 sequentially embeds plaintext fragments in $D_m$ plaintext polynomial factors (step S5). In this embodiment, since the plaintext polynomial factors are a linear expression, $m_i(x,y)=m_{x,i}(t)x+m_{y,i}(t)y+m_{1,i}(t)$ (i=1, \ldots, $D_m$), where the degree of each coefficient $m_{x,i}(t)$, $m_{y,i}(t)$, and $m_{1,i}(t)$ is $d_m$, and the coefficients of these polynomials are elements of $F_p$. The plaintext embedding unit 3 embeds the plaintext fragments in each of the plaintext polynomial factors of the linear expression to generate a plaintext polynomial factors $m_1(x,y), \ldots, m_{Dm}(x,y)$ As described above, the block size of the cryptographic method of the present embodiment is $3(|p|-1)(d_m+1)$. When a plaintext larger than this size is input, it is divided into this block size and then each block is encrypted.

The plaintext embedding unit 3 inputs the generated $D_m$ plaintext polynomial factors to the encryption unit 5.

Upon receiving the public key from the public-key acquisition unit 2, the encryption unit 5 acquires from the storage unit 4 system parameters p, $\Gamma_r$, $d_e$, $d_s$, and n that match the public key. The encryption unit extracts a non-zero term from the public key $X(x,y)$ to calculate a term set $\Gamma_X$ of $X(x,y)$, and calculates $\Gamma_X \Gamma_r$, thereby deriving a term set $\Gamma_c$ of a noise polynomial $e(x,y)$.

In addition, the encryption unit 5 inputs the system parameters p, n, and Fr to the polynomial generation unit 6 to instruct the polynomial generation unit 6 to generate a random polynomial r(x,y) having a polynomial of the n−1th order according to the term set $\Gamma_r$ as a coefficient. The polynomial generation unit 6 instructs the random value generation unit 7 to generate integers from 0 to p−1 which is a coefficient of the coefficient $r_{ij}(t)$ by a required number (n #$\Gamma_r$ in this case), and generates r(x,y) based on these integers (step S6). Note that #Fr represents the number of elements of the set Fr.

The encryption unit 5 continues to generate the noise polynomial e(x,y) by the same method as the method of generating the random polynomial r(x,y) based on the system parameters p, $d^e$ and a noise polynomial form $\Gamma_e$ (step S7).

Finally, the encryption unit 5 generates, by using the following Formula (50), a ciphertext c(x,y) from the random polynomial r(x,y), the noise polynomial e(x,y), the public key (X(x,y), f(t)), and the $D_m$ plaintext polynomial factors $m_1(x,y), \ldots, m_{Dm}(x,y)$ (step S8). The encryption unit 5 inputs the ciphertext c(x,y) to the ciphertext output unit 9.

$$c(x,y)=m_1(x,y), \ldots ,m_{D_m}(x,y)+X(x,y)r(x,y)+f(t)e(x,y) \qquad (50)$$

The ciphertext output unit 9 outputs the ciphertext c(x,y) as an output of the encryption device 10 (if necessary, after transforming it according to a predetermined format) (step S9).

Figure 3:
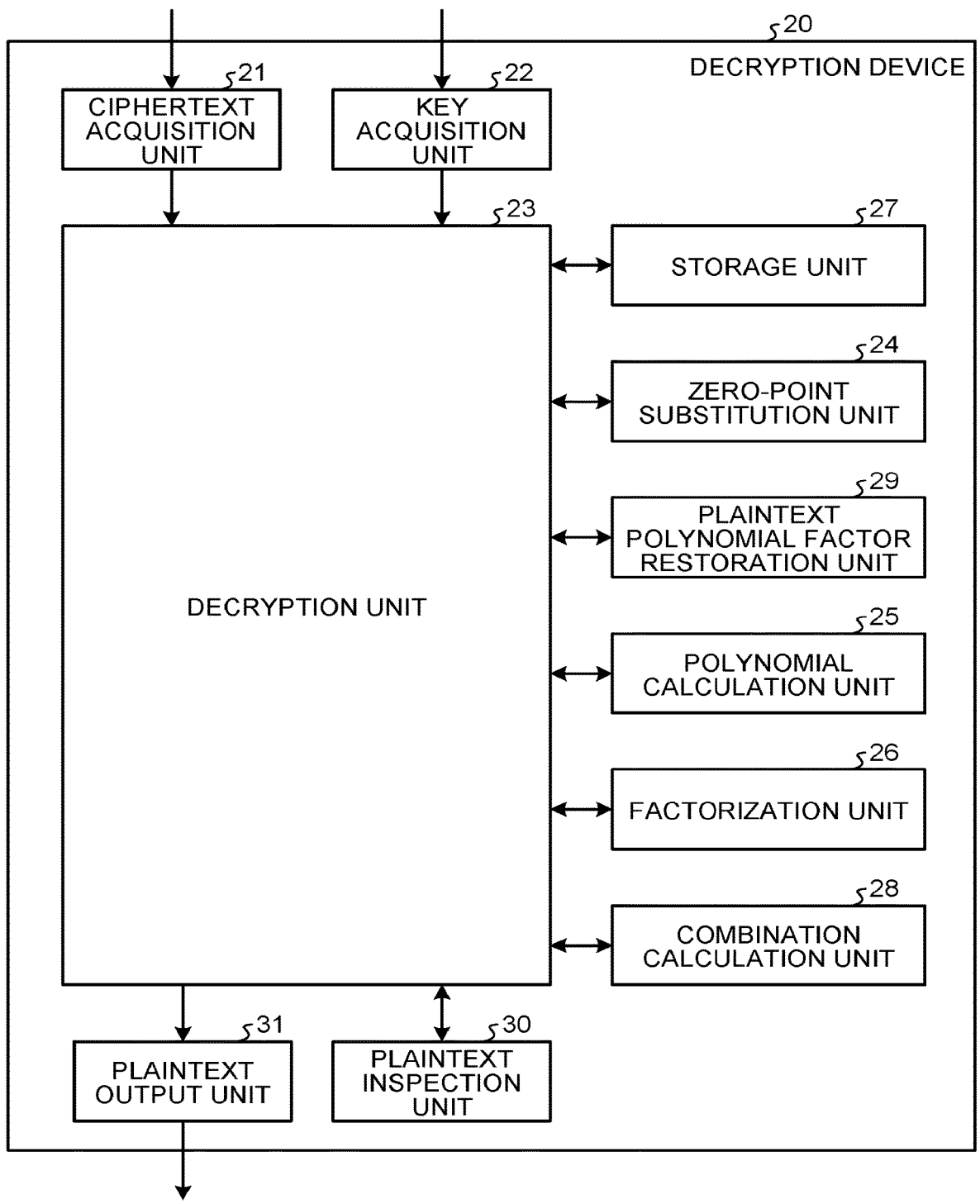
FIG. 3 is a diagram illustrating an example of a functional configuration of a decryption device according to the embodiment.

Next, the configuration and the flow of processing of the decryption device of the present embodiment will be described along the flowchart illustrated in FIG. 4 with reference to the overall configuration diagram illustrated in FIG. 3.

The decryption device 20 of the embodiment includes a ciphertext acquisition unit 21, a key acquisition unit 22, a decryption unit 23, a zero-point substitution unit 24, a polynomial calculation unit 25, a factorization unit 26, a storage unit 27, a combination calculation unit 28, a plaintext polynomial factor restoration unit 29, a plaintext inspection unit 30, and a plaintext output unit 31.

Figure 4:
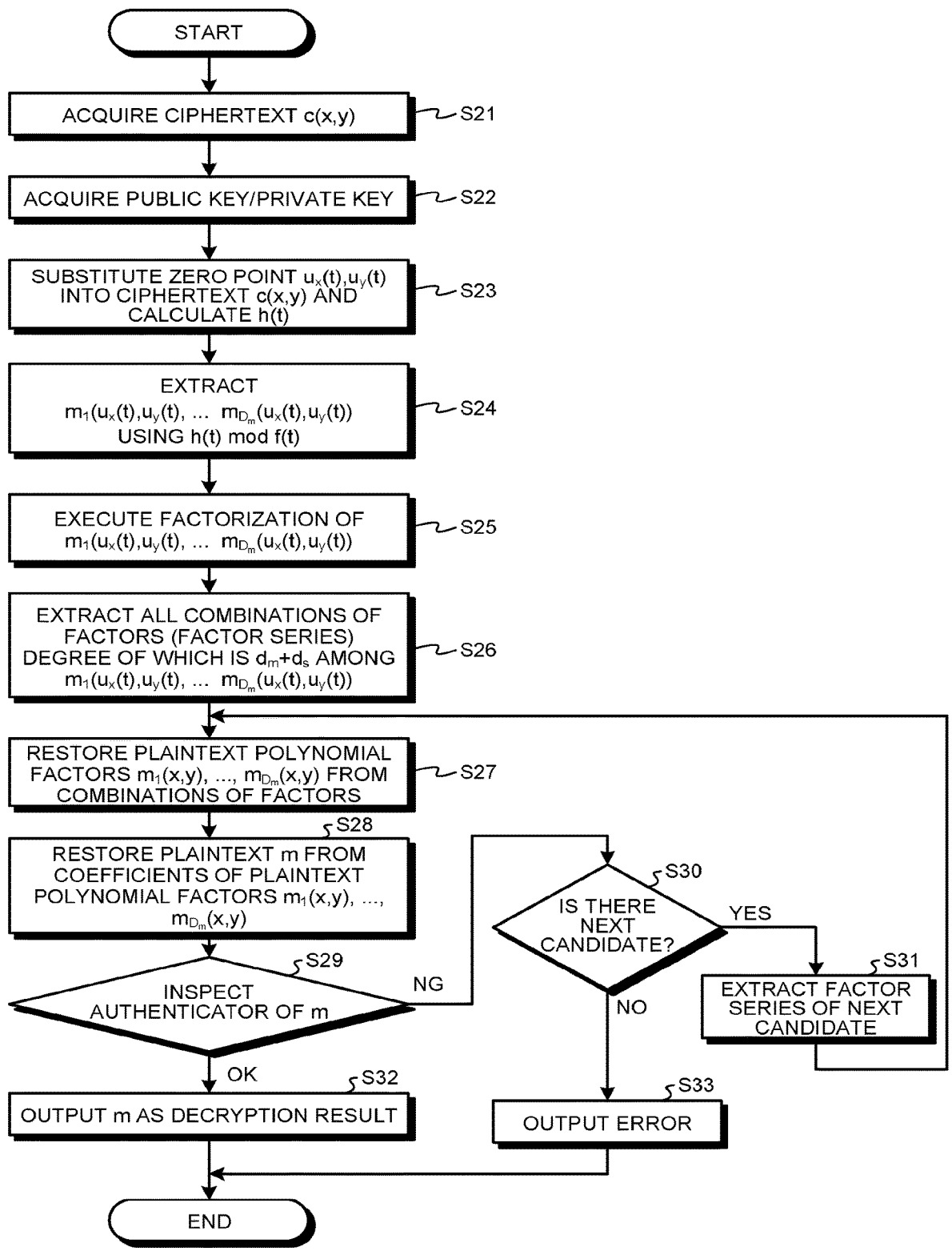
FIG. 4 is a flowchart illustrating an example of a decryption method according to the embodiment.

As shown in FIG. 4, the ciphertext acquisition unit 21 acquires the ciphertext c(x,y) (step S21). The ciphertext acquisition unit 21 acquires the ciphertext c(x,y) from another device over a network, for example.

Next, the key acquisition unit 22 acquires the public key (X(x,y), f(t)) and a private key (zero point u: ($u_x(t)$, $u_y(t)$)) (step S22). The key acquisition unit 22 acquires a public key (X(x,y), f(t)) from another device or the like via, for example, a network, and acquires the private key (zero point u: ($u_x(t),u_y(t)$)) from the storage unit 27 in the decryption device or the like.

Next, the decryption unit 23 receives the ciphertext c(x,y) from the ciphertext acquisition unit 21 and receives the public key (X(x,y), f(t)) and the private key (zero point u: ($u_x(t)$, $u_y(t)$)) from the key acquisition unit 22. Then decryption processing is started.

The decryption unit 23 inputs the ciphertext c(x,y) and the zero point u to the zero-point substitution unit 24. The zero-point substitution unit 24 substitutes the zero point u into c(x,y) and calculates h(t) (step S23). The zero-point substitution unit 24 inputs h(t) to the decryption unit 23.

Next, upon receiving h(t) from the zero-point substitution unit 24, the decryption unit 23 inputs h(t) into the polynomial calculation unit 25. Upon receiving h(t) from the decryption unit 23, the polynomial calculation unit 25 calculates h(t) mod f(t) and inputs the calculation result of h(t) mod f(t) to the decryption unit 23 (step S24).

Next, upon receiving the calculation result of h(t) mod f(t) from the polynomial calculation unit 25, the decryption unit 23 inputs the calculation result to the factorization unit 26. Upon receiving the calculation result of h(t) mod f(t) (residue μ(0) from the decryption unit 23, the factorization unit 26 executes the factorization of the calculation result (step S25), and inputs the result of the factorization to the decryption unit 23 as an ordered factor array of factors.

Next, the decryption unit 23 extracts system parameters $d_s$ and $d_m$ from the storage unit 27, extracts the degree of each factor from the factor array input from the factorization unit 26, and generates a corresponding degree array. Furthermore, the decryption unit 23 inputs the degree array and N(=$d_s$+$d_m$) corresponding to the degree of the plaintext polynomial factors to the combination calculation unit 28. The combination calculation unit 28 extracts all combinations of factors (factor series) the degree of which is exactly N (step S26), and inputs a list of the factor series to the decryption unit 23.

Upon receiving the list of the factor series from the combination calculation unit 28, the decryption unit 23 extracts the factor series from the list and inputs it to the plaintext polynomial factor restoration unit 29, together with the zero point u and the system parameters $d_s$ and $d_m$. The plaintext polynomial factor restoration unit 29 restores plaintext polynomial factors $m_1(x,y), \ldots, m_{Dm}(x,y)$ from the factor series input from the decryption unit 23, the zero point u, and the system parameter $d_m$ by the above method (step S27), and inputs the plaintext polynomial factors to the decryption unit 23.

Upon receiving the plaintext polynomial factors $m_1(x,y), \ldots, m_{Dm}(x,y)$ from the plaintext polynomial factor restoration unit 29, the decryption unit 23 extracts the plaintext divided from the coefficients of the plaintext polynomial factors and restores the plaintext m (step S28), and inputs the plaintext m to the plaintext inspection unit 30.

The plaintext inspection unit 30 inspects the above-mentioned authenticator included in the plaintext m, and determines pass/fail (step S29). The plaintext inspection unit 30 inputs the pass/fail determination result to the decryption unit 23.

When the pass/fail determination result is a pass (step S29: OK), the plaintext output unit 31 outputs m as a decryption result (step S32), and the decryption processing ends.

On the other hand, when the pass/fail determination result is a failure (step S29: NG), the decryption unit 23 determines whether there is a next plaintext polynomial factor candidate (step S30). When there is a next plaintext polynomial factor candidate (step S30: Yes), the decryption unit 23 extracts the next plaintext polynomial factor candidate (step S31), and returns to the process in step S27.

When there is no next plaintext polynomial factor candidate (step S30, No), the plaintext output unit 31 outputs an error indicating a decryption failure (step S33), and the decryption processing ends. As a cause of the decryption failure, it is conceivable that the ciphertext was broken or tampered with on the communication path.

Figure 5:
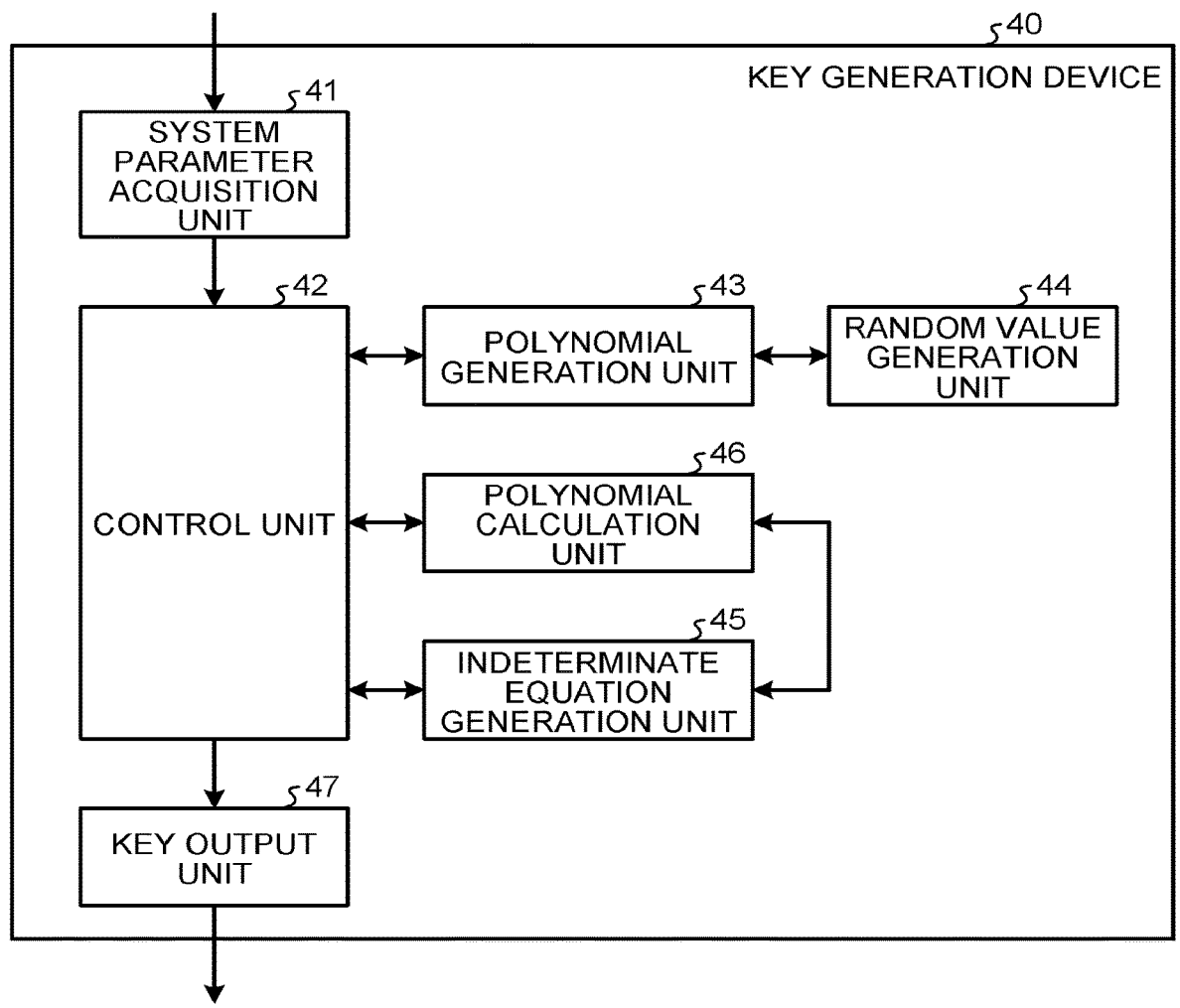
FIG. 5 is a diagram illustrating an example of a functional configuration of a key generation device of the embodiment.

Next, the configuration and the flow of processing of the key generation device of the present embodiment will be described along the flowchart illustrated in FIG. 6 with reference to the overall configuration diagram illustrated in FIG. 5.

A key generation device 40 of the embodiment includes a system parameter acquisition unit 41, a control unit 42, a polynomial generation unit 43, a random value generation unit 44, an indeterminate equation generation unit 45, a polynomial operation unit 46, and a key output unit 47.

Figure 6:
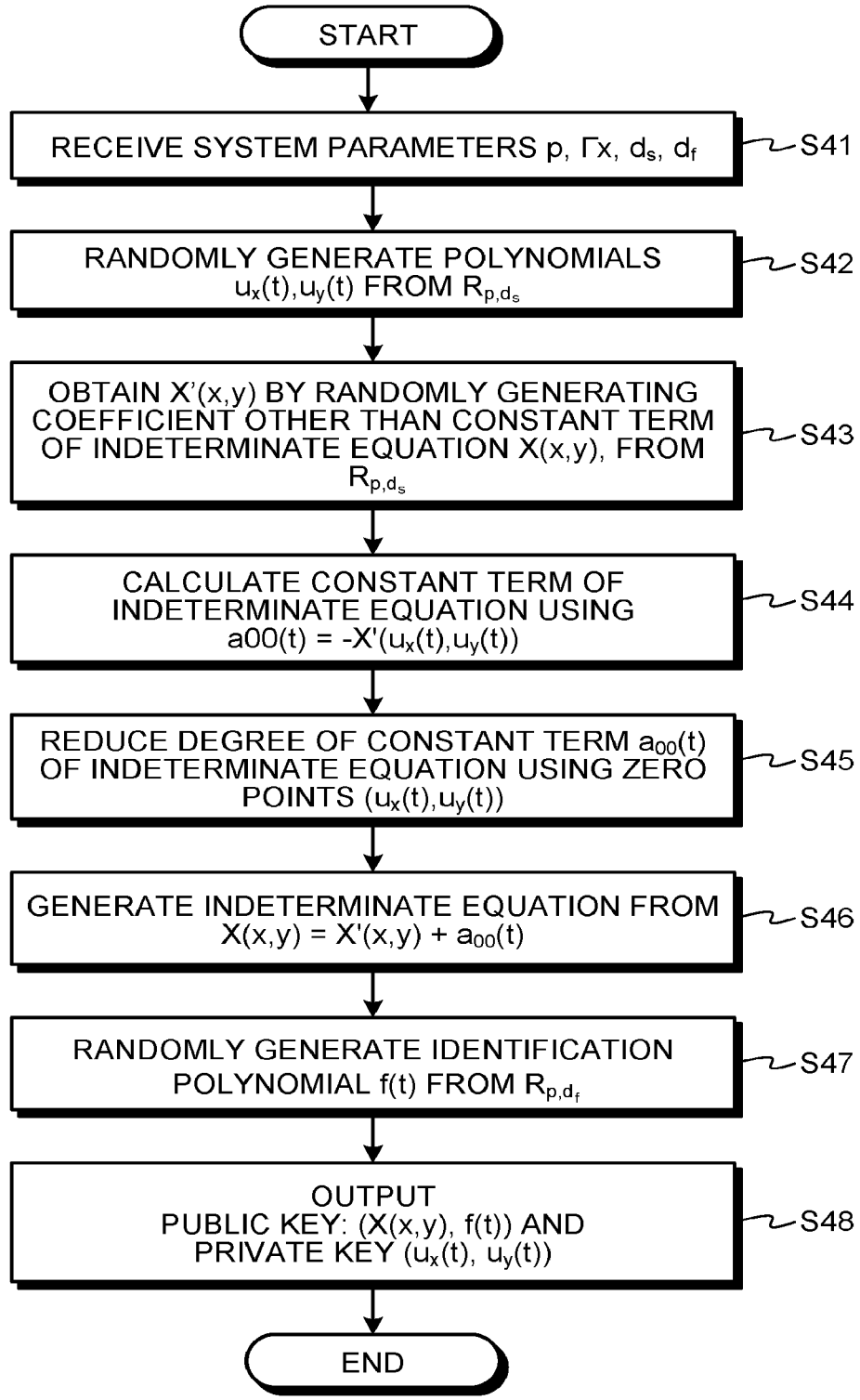
FIG. 6 is a flowchart illustrating an example of a key generation method of the embodiment.

As shown in FIG. 6, the system parameter acquisition unit 41 acquires the system parameters p, Γx, $d_s$, and $d_f$ (step S41). The system parameters p, Γx, $d_s$, and $d_f$ are acquired by, for example, receiving an input from the user. Alternatively, for example, the system parameters p, Γx, $d_s$, and $d_f$ are acquired by reading setting data or the like including the system parameters p, Γx, $d_s$, and $d_f$.

The system parameter acquisition unit 41 inputs the system parameters to the control unit 42. The control unit 42 performs the following processing in cooperation with other processing units based on the system parameters input from the system parameter acquisition unit 41.

First, the control unit 42 inputs p and $d_s$ among the system parameters input from the system parameter acquisition unit 41 to the polynomial generation unit 43, and instructs the generation of two polynomials $u_x(t)$, $u_y(t)$ included in $R_{p,ds}$. Next, the polynomial generation unit 43 instructs the random value generation unit 44 to generate $2(d_s+1)$ integers from 0 to p−1. The random value generation unit 44 generates $2(d_s+1)$ random numbers from 0 to p−1 using a pseudo random number generator or the like, and inputs the random numbers to the polynomial generation unit. The polynomial generation unit 43 generates polynomials $u_x(t)$ and $u_y(t)$ having $2(d_s+1)$ random numbers input from the random value generation unit 44 as coefficients (step S42), and inputs the polynomials $u_x(t)$ and $u_y(t)$ to the control unit 42.

The control unit 42 holds (stores), as a private key, the polynomials $u_x(t)$ and $u_y(t)$ received from the polynomial generation unit 43.

The control unit 42 also generates a public key (indeterminate equation X(x,y) represented by the following Formula (51)).

$$X(x,y)=\Sigma_{(i,j)\in \Gamma x}a_{ij}(t)x^i y^j \quad (51)$$

The control unit 42 extracts a coefficient $a_{ij}(t)$ other than the constant term of X(x,y) from $R_{p,ds}$ in order to generate the public key. Specifically, the control unit 42 inputs the parameters p and $d_s$ to the polynomial generation unit 43, as in the case of generating the above-described polynomials $u_x(t)$ and $u_y(t)$, and instructs the generation of $\#\Gamma_x-1$ polynomials included in $R_{p,ds}$. The polynomial generation unit 43 generates a polynomial coefficient using the random value generation unit 44, and generates $2(d_s+1)$ polynomials having the coefficient. The polynomial generation unit 43 inputs $2(d_s+1)$ polynomials to the control unit 42.

The control unit 42 inputs the polynomials generated by the polynomial generation unit 43, the system parameters p, $\Gamma_x$, $d_s$, and the private key $u_x(t)$, $u_y(t)$ to the indeterminate equation generation unit 45.

The indeterminate equation generation unit 45 generates, by using the polynomial operation unit 46, an indeterminate equation X'(x,y) having no constant (step S43). The indeterminate equation generation unit 45 calculates a constant term $a_{00}(t)=-X'(u_x(t),u_y(t))$ by substituting the private key (polynomials $u_x(t)$ and $u_y(t)$) into the variables x and y of X'(x,y) (step S44).

Next, the indeterminate equation generation unit 45 performs processing of reducing the degree of the constant term $a_{00}(t)$ (step S45).

An example of this processing of reducing the degree will be described in detail with reference to FIG. 7. In this processing of reducing the degree, the constant term $a_{00}(t)$ and the private key $u_x(t)$ and $u_y(t)$ is input, and another indeterminate equation is created with a constant term of the degree $d_s$ or less among indeterminate equations having the same zero point.

The basic principle is to use the private key (zero point) for replacement with an indeterminate equation with a smaller degree of a constant term having the same zero point, and the theoretical background is as described above.

For simplicity, it is assumed in the following description that X(x,y) includes all terms of $x^i$ (i=1, ..., degX). As shown in FIG. 7, the indeterminate equation generation unit 45 sets i=degX(x,y) (step S61), calculates $a_{00}(t)$ mod $u_x(t)'$, replaces $a_{00}(t)$, and calculates $a_{i0}'(t)=a_{00}(t)/u_x(t)'$ (step S62), and replaces X'(x,y) with $Xl(x,y)+a_{i0}'(t)x^i$ (step S63). This processing is continued while decrementing i by 1 (step S64) until i becomes 1 (step S65).

Figure 7:
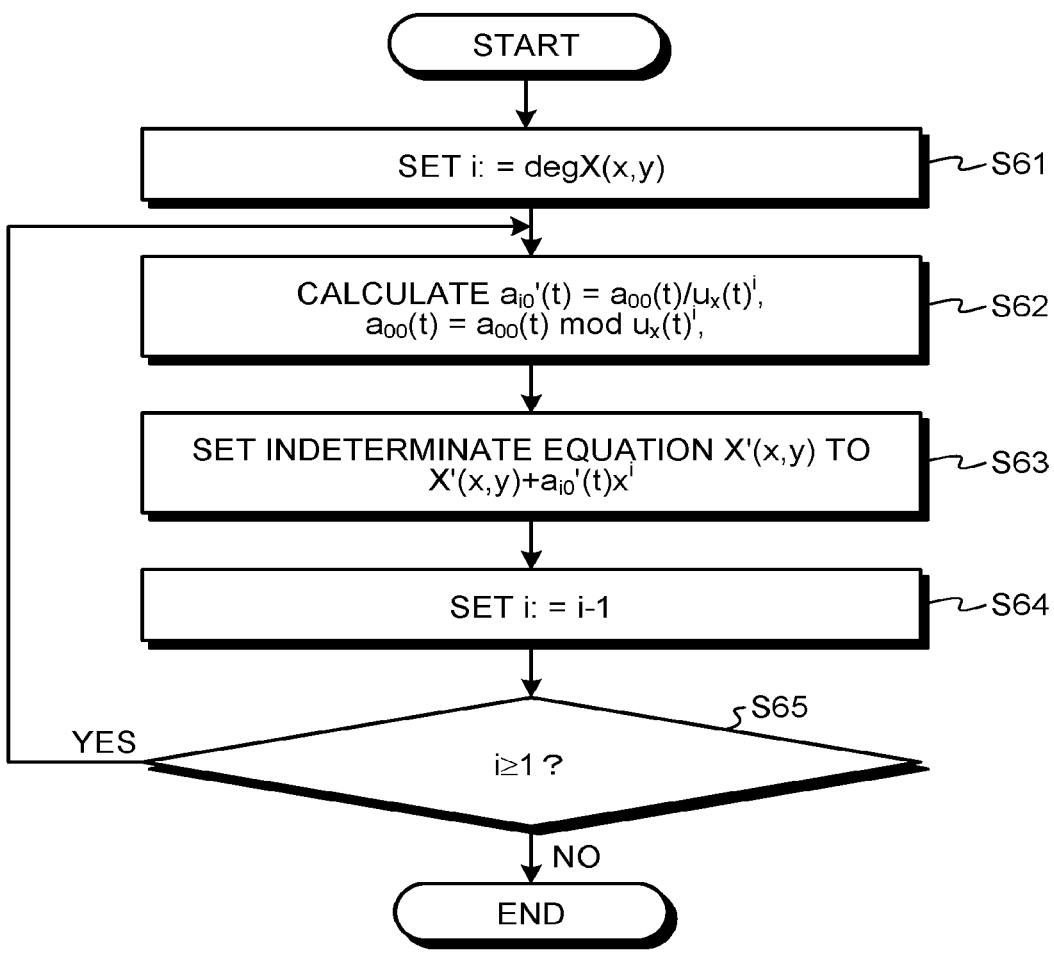
FIG. 7 is a flowchart illustrating an example of degree reduction processing (details of step S45) of the embodiment.

Now, returning to FIG. 6, when the processing in FIG. 7 is performed for X'(x,y), the result is as follows. Since $a_{00}(t)$ is set to $a_{00}(t)=-X'(u_x(t),u_y(t))$, and the degree of each coefficient of X'(x,y) is $d_s$, the degree of $a_{00}(t)$ does not exceed $d_s(\deg X(x,y)+1)$ and is expected to be approximately $d_s(\deg X(x,y)+1)$. On the other hand, the processing in FIG. 7 causes the degree of $a_{00}(t)$ to be less than $d_s \deg X(x,y)$, which is reduced by about the degree $d_s$ compared to the original $a_{00}(t)$. Furthermore, since $a_{i0}'(t)$ is a quotient obtained by dividing $a_{00}(t)$ by $u_x(t)\deg X(x,y)$, the degree becomes $d_s$ or less, and does not exceed the degree of $a_{00}(t)$. Based on this, it can be seen that by the processing in FIG. 7, the indeterminate equation X'(x,y) can reduce the degree of the constant term by $d_s$ without changing the degrees of the coefficients other than the constant term. By continuing this operation until i becomes 0, it is possible to reduce only the constant term to less than $d_s$ without finally changing the degrees of the coefficients other than the constant term of X'(x,y).

Next, the indeterminate equation generation unit 45 generates an indeterminate equation by $X(x,y)=X'(x,y)+a_{00}(t)$ (step S46).

It is shown that the generated X(x,y) has the same zero point $(u_x(t), u_y(t))$ as the original indeterminate equation X'(x,y)+$a_{00}(t)$. To this end, it is necessary to show that the indeterminate equation obtained in each step has the zero point $(u_x(t),u_y(t))$. The indeterminate equation obtained in each step is $X'(x,y)+a_{i0}'(t)x^i+(a_{00}(t)$ mod $u_x(t)')$. Substituting the zero point $(u_x(t),u_y(t))$ into this equation gives the following Formula (52), which shows that the zero point is obtained.

$$X'(u_x(t),u_y(t))+a'_{i0}(t)u_x(t)^i+(a_{00}(t)\bmod u_x(t)^i)=X'(u_x(t),u_y(t))+a_{00}(t)=0 \quad (52)$$

The indeterminate equation X(x,y) thus generated is output from the indeterminate equation generation unit to the control unit 42. The control unit 42 inputs the system parameters p and $d_f$ to the polynomial generation unit 43 in order to generate the identification polynomial f(t) included in $R_{p,df}$. The polynomial generation unit 43 generates the identification polynomial f(t) using the random value generation unit 44, similarly to the above-described processing of generating $u_x(t)$, $u_y(t)$ (step S47), and outputs the identification polynomial to the control unit.

The control unit 42 inputs the generated public key (X(x,y), f(t)) and private key ($u_x(t)$, $u_y(t)$) to the key output unit 47. The key output unit 47 outputs the public key (X(x,y), f(t)) and the private key ($u_x(t)$, $u_y(t)$) input from the control unit 42 to the outside of the key generation device (step S48).

Figure 8:
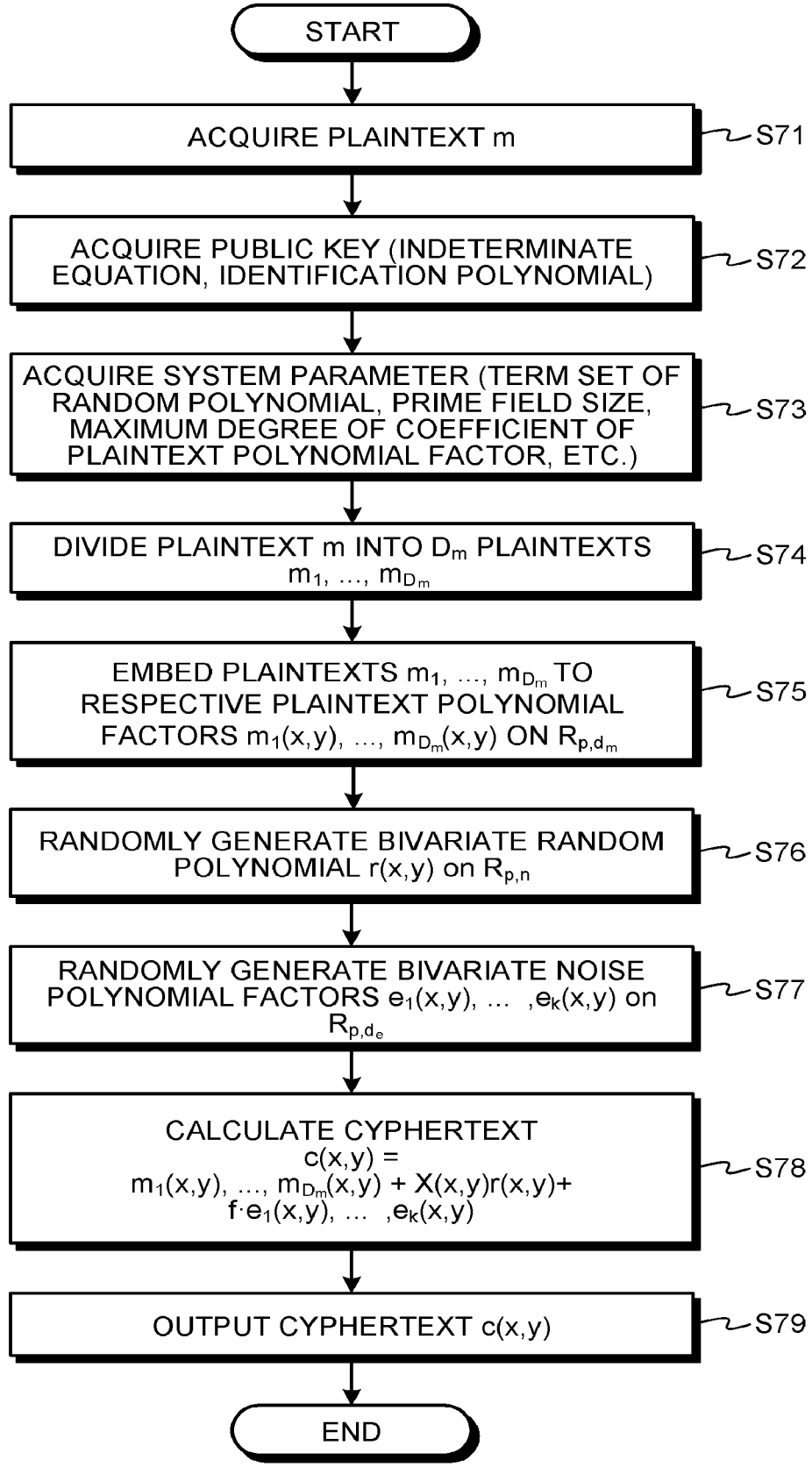
FIG. 8 is a flowchart illustrating an example of an encryption method according to a modification of the embodiment.

Finally, a specific configuration regarding variations will be described. The variation in the noise polynomial is a variation that provides a structure of the product of the noise polynomial (Formula (45) described above) and can be restored in decryption. Therefore, in the above encryption algorithm, as shown in FIG. 8, the generation of the noise polynomial factor (step S77) is performed in the same manner as the generation of the plaintext polynomial of the present embodiment, while the ciphertext is generated in a different way by means of the following Formula (53) (step S78). The processing in steps S71 to S76 and step S79 is the same as the processing in steps S1 to S6 and step S9 in FIG. 2 described above.

$$c(x,y)=m_1(x,y) \ldots m_{D_m}(x,y)+X(x,y)r(x,y)+f(t)\cdot e_1(x,y) \ldots e_k(x,y) \quad (53)$$

Figure 9A:
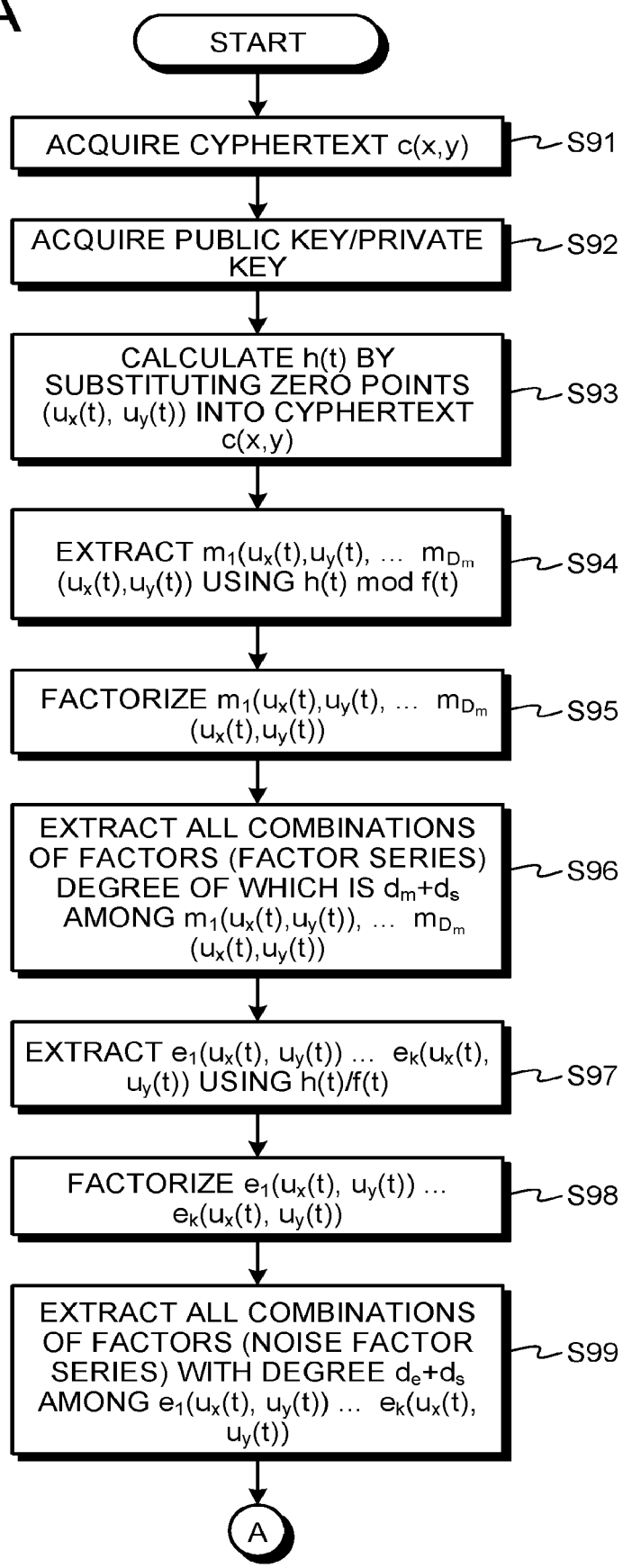
FIG. 9A is a flowchart illustrating an example of a decryption method according to a modification of the embodiment.

As shown in FIG. 9A, with regard to the decryption algorithm, in order to restore noise polynomials $e_1(x,y), \ldots, e_k(x,y)$, $h(t)=c(u_x(t), u_y(t))$ is divided by $f(t)$ to obtain a quotient (step S97), which is in turn factorized (step S98), and then the processing of obtaining a combination of factors, among the resulting factors, the degree of which is $d_s+d_e$ (noise factor series) (step S99) is required. The processing in steps S91 to S96 is the same as the processing in steps S21 to S26 in FIG. 4 described above.

As shown in FIG. 9B, the plaintext polynomial factor restoration unit 29 sequentially extracts candidates from the plaintext factor series and the noise factor series to restore them to plaintext polynomial factors $m_1(x,y), \ldots, m_{Dm}(x,y)$ and noise polynomial factors $e_1(x,y), \ldots, e_k(x,y)$ (step S100 to step S103), and calculates $q(x,y)=c(x,y)-f(t)e_1(x,y) \ldots e_k(x,y)-m_1(x,y) \ldots m_{Dm}(x,y)$ for each of them (step S104).

Next, the plaintext polynomial factor restoration unit 29 determines whether $q(x,y)$ can be divided by the public key $X(x,y)$ (step S105). When the correct plaintext polynomial factors and noise polynomials are obtained here, $q(x,y)/X(x,y)=r(x,y)$ should be able to be calculated from the ciphertext formula. Therefore, when $q(x,y)$ is divided by the public key $X(x,y)$ (step S105: Yes), the plaintext polynomial factor restoration unit 29 actually finds $r(x,y)$ (step S106) and restores the plaintext m from the obtained plaintext polynomial factors (step S107), and outputs the plaintext m (step S108).

On the other hand, when $q(x,y)$ is not divided by the public key $X(x,y)$ (step S105: No), the plaintext polynomial factor restoration unit 29 extracts the following series of plaintext polynomial factors and noise polynomial factors (steps S109 and S110), and the same process is repeated (FIG. 9C: steps S111 and S112). Finally, when $q(x,y)$ is not divided by the public key $X(x,y)$ in any combination (step S110, No), the ciphertext may have been broken in the transmission path or tampered with, and thus the plaintext output unit 31 outputs an error (step S113), and the processing of the decryption device 20 ends.

In this variation, the ambiguity of the plaintext polynomial factors is removed by restoring the polynomials $r(x,y)$, $e_1(x,y), \ldots, e_k(x,y)$ generated during encryption. For this reason, the authenticator used in the present embodiment is not required.

A variation that replaces the roles of the plaintext polynomial and the noise polynomial is to change the ciphertext generation formula in the encryption device 10, and also in the decryption device 20, $h(t)=c(u_x(t),u_y(t))$ is calculated, and then $m_1(u_x(t),u_y(0)), \ldots, m_{Dm}(u_x(t),u_y(t))$ is calculated by $h(t)/f(t)$, and the subsequent process can be performed in the same manner.

It should be noted that the combination with variations in the noise polynomial can also be implemented by the same modification. As for the variation regarding the encryption operation, the only change is to replace the addition in the ciphertext with a subtraction. Therefore, this change can be naturally reflected on the encryption device 10 and the decryption device 20 of the present embodiment.

Regarding the variation regarding variables, only the number of variables in the encryption algorithm, the decryption algorithm, and the key generation algorithm is needed to change from the present embodiment. That is, this can be implemented simply by obvious changes such as changes in the variables x and y to variables $x_1, \ldots, x_l$ and changes in the private key to be substituted into these variables to $(u_{x1}(t), \ldots, u_{xl}(t))$.

The variation regarding the coefficients of the indeterminate equation aims to more flexibly change the way for obtaining the degrees of the coefficients of the indeterminate equation, which serves as a public key. Therefore, this can be implemented by selecting and adopting another polynomial set such as from $R_{p,ds}$ to $R_{p,n}$, n as a set for selecting coefficients other than the constant term of the indeterminate equation in the key generation algorithm. However, when $R_{p,n}$ is selected, the degree reduction algorithm of the constant term described in the present embodiment is not required because the degrees of all the coefficients are $n-1$ or smaller due to the modular polynomial $g(t)$.

Consideration on Security

The security of the public-key cryptography of the present invention implemented in the embodiment will be considered below.

Linear Algebraic Attack

A consideration will be given while regarding that this is a problem of obtaining a product M of the polynomials $m_i$ ($i=1, \ldots, k$) in a set $F_m/R_{p,dm}$, in a case where a public key X, f and a corresponding polynomial Y ($=m_1 m_2 \ldots m_k+X_r+$ f·e) on $R_{p,n}$ are given. In fact, when M is obtained correctly, the polynomial $m_i$ ($i=1, \ldots, k$) can be obtained, and the cryptosystem can be broken.

Here, for the sake of simplicity, a discussion will be made under the condition expressed in the following Formula (54).

$$\deg m_i(x,y)=1 \, (i=1,2)$$

$$\deg e(x,y)=2$$

$$\Gamma_m=\{(1,0),(0,1),(0,0)\}$$

$$D_x=D_r=d_m=d_e=1 \quad (54)$$

Here, M, r, e, and Y can be expressed as in the following Formula (55).

$$M(x,y)=M_{20}x^2+M_{11}xy+M_{02}y^2+M_{10}x+M_{01}y+M_{00}$$

$$r(x,y)=r_{10}x+r_{01}+r_{00}$$

$$e(x,y)=e_{20}x^2+e_{11}xy+e_{02}y^2+e_{10}x+e_{01}y+e_{00}$$

$$Y(x,y)=d_{20}x^2+d_{11}xy+d_{02}y^2+d_{10}x+d_{01}y+d_{00} \quad (55)$$

The ciphertext $c(x,y)$ can be expressed as in the following Formula (56).

$$\sum_{(i,j)\in \Gamma_{X_r}} d_{ij} x^i y^j = \left(\sum_{(i,j)\in \Gamma_M} M_{ij} x^i y^j\right) + \left(\sum_{(i,j)\in \Gamma_M} a_{ij} x^i y^j\right)\left(\sum_{(i,j)\in \Gamma_r} r_{ij} x^i y^j\right) + f\left(\sum_{(i,j)\in \Gamma_e} e_{ij} x^i y^j\right) \quad (56)$$

The linear algebraic attack refers to an attack of obtaining M, r, and e, with simultaneous equations obtained by calculating the right side with coefficients $M_{ij}$, $r_{ij}$, and $c_{ij}$, of M, r, and e, being unknown and performing coefficient comparison with terms $x^i y^i$ on the left side. Here, the simultaneous equations of the following Formula (58) can be derived from the following Formula (57).

$$X(x,y)r(x,y) = a_{10}r_{10}x^2 + (a_{10}r_{01} + a_{01}r_{10})xy + a_{01}r_{01}y^2$$
$$(a_{10}r_{00} + a_{00}r_{10})x + (a_{01}r_{00} + a_{00}r_{01})y + a_{00}r_{00} \quad (57)$$

$$M_{20} + a_{10}r_{10} + fe_{20} = d_{20}$$

$$M_{11} + a_{10}r_{01} + a_{01}r_{10} + fe_{11} = d_{11}$$

$$M_{02} = a_{01}r_{01} + fe_{20} = d_{02}$$

$$M_{10} + a_{10}r_{00} + a_{00}r_{10} + fe_{10} = d_{10}$$

$$M_{01} + a_{01}r_{00} + a_{00}r_{01} + fe_{01} = d_{01}$$

$$M_{00} + a_{00}r_{00} + fe_{00} = d_{00} \quad (58)$$

The number of variables is 15, and the number of equations in the simultaneous linear equations is 6, so that 9 dimensional solution spaces are obtained. Generally, a $\#\Gamma_r + \#\Gamma_e$ dimensional solution space is obtained with the number of variables being $\#\Gamma_m + \#\Gamma_r + \#\Gamma_e$ and the number of equations being $\#\Gamma_m$.

However, when the equations on $R_{p,n}$ as expressed in the above-described Formula (58) is considered as equations on $F_p$, there will be 6n equations. On the other hand, the numbers of the corresponding variables $M_{ij}$, $r_{ij}$, and $e_{ij}$ are respectively in $R_{p,Dmdm}$, $R_{p,n}$, and $R_{p,de}$. Thus, the numbers of these variables are 18, 3n, and 12, and thus the total number of variables is 3n+30 under the condition of the above-described Formula (54). Since n is 21 in this example, the number of equations is 93 and the number of variables is 126. In the general sense, this means that there is no solution space. Still, since it is known that there is at least one solution here, a desired solution is likely to be obtained.

Generally, the number of variables included in $e_{ij}$ (element of $p, d_e$) is expressed as in the following Formula (59).

$$_{(D_X+D_r+2)}C_{(D_X+D_r)} \cdot (d_e + 1) = \quad (59)$$
$$_{(D_X+D_r+2)}C_2 \cdot (d_e + 1) = (D_X + D_r + 2)(D_X + D_r + 1)(d_e + 1)/2$$

The number of variables included in $r_{ij}$ (element of p,n) is $n \cdot _{Dr+2}C_{Dr} = n \cdot (D_r+2)(D_r+1)/2$, and the number of variables included in $M_{ij}$ (element of $R_{p,2dm}$) is $3(2d_m+1)$. On the other hand, the number of equations is as expressed in the following Formula (60).

$$D_x + D_r + 2C_2 \cdot n = (D_X + D_r + 2)(D_X + D_r + 1) \cdot n/2 \quad (60)$$

Taking into consideration the system parameter constraints by the above Formulas (15) to (17), among the independent parameters $D_X$, $D^r$, $d_m$, $d^e$, $D_X$ is fixed and $D_r$, $d_e$ are increased to be included in $r_{ij}$. As the number of variables to be calculated approaches the number of expressions and the number of variables included in $e_{ij}$ increases, the number of variables as a whole exceeds the number of expressions and becomes indeterminate. Actually, FIG. 10 illustrates how the number of variables and the number of equations change when the following are fixed and the other conditions vary among the conditions of the above Formula (54).

$$\deg m_i(x,y) = 1 (i = 1, \ldots, k)$$

$$D_X = 2$$

With reference to FIG. 10, when $d^e$ is set to be sufficiently large, a simultaneous equation with a solution space exists, and the solution cannot be uniquely determined, which makes it necessary to select a polynomial that can be decomposed into $M = m_1 m_2 \ldots m_k$ through a brute-force attack against the solution space.

Local Attack

Now, an attack that partially solves the simultaneous equations in the above-described Formula (58) is considered. For example, it is examined whether only the first equation $M_{20} + a_{10}r_{10} + fe_{20} = d_{20}$ of the simultaneous equations of the above-described Formula (58) can be solved. When this is solved, the plaintext polynomial partial information $M_{20}$ can be acquired. However, the equation is obviously indefinite because the number of variables is $2d_m + d_e + n + 2$ and the number of equations is n. This is always the case regardless of which equation is picked up, as long as only a single equation is picked up.

Thus, a consideration will now be given on a case where a combination of a plurality of equations is picked up. For example, in a case of the following combination, $r_{10}$ and $r_{00}$ with the largest number of variables overlap.

$$M_{20} \pm a_{10}r_{10} + fe_{20} = d_{20}$$

$$M_{10} + a_{10}r_{00} + a_{00}r_{10} + fe_{10} = d_{10}$$

$$M_{00} + a_{00}r_{00} + fe_{00} = d_{00}$$

Thus, the number of variables is $2n + (D_X + D_r + 1)(d_m + 2d_e + 2)$ and the number of equations is 3n. Therefore, the number of variables can be expected to exceed the number of equations by increasing $d^e$ with $D_X$ fixed as in the case of the analysis on the linear algebraic attack. In fact, it has been confirmed that the calculation using the parameters that are the same as those in FIG. 10 with $D_X$ being 2 results in indefinite equation as illustrated in FIG. 11 also in a case of the local equation.

Key Restoration Attack

In this cryptographic method, the private key is a solution included in $R_{p,ds}$ among solutions of the indeterminate equation $X(x,y) = 0$ with the coefficient ring $R_{p,n} (= F_p/g(t))$. Thus, it is possible to break the cryptosystem by obtaining the private key.

Here, it can be understood that $n > (D_X + 1)d_s$ holds considering that $D_r$, $d_m$, and $d^e \geq 1$ holds and from the condition in the above-described Formula (17). This means that $\deg X(v_x(t), v_y(t)) < n$ always holds when a pair of polynomials $(x,y) = (v_x(t), v_y(t))$ with the degree being the same as that of the solution to be obtained $(d_s)$ are substituted into the $X(x,y)$ as the polynomial on $F_p[t]$. Thus, a problem of obtaining a solution with the degree $d_s$ among solutions of the indeterminate equation $X(x,y) = 0$ with the coefficient ring $R_{p,n} (= F_p/g(t))$ is equivalent to a problem of obtaining a solution on $F_p[t]$ of $X(x,y) = 0$. In fact, when the former solution can be obtained, then the latter solution is obtained, and vice versa. Thus, the key restoration attack results in a section finding problem.

Finally, an example of the hardware configuration of the encryption device 10, the decryption device 20, and the key generation device 40 of the embodiment will be described.

Example of Hardware Configuration

FIG. 12 is a diagram illustrating an example of the hardware configuration of the encryption device 10, the decryption device 20, and the key generation device 40 of the embodiment.

The encryption device 10, the decryption device 20, and the key generation device 40 of the embodiment include a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected to each other via a bus 310.

The control device 301 executes a program loaded on to the main storage device 302 from the auxiliary storage device 303. The main storage device 302 is a memory such as a Read Only Memory (ROM) and a Random Access Memory (RAM). The auxiliary storage device 303 is a Hard Disk Drive (HDD), a Solid State Drive (SSD), a memory card, or the like.

The display device 304 displays display information. The display device 304 is, for example, a liquid crystal display or the like. The input device 305 is an interface for operating a computer. The input device 305 is, for example, a keyboard or a mouse. When the computer is a smart device such as a smartphone or a tablet terminal, the display device 304 and the input device 305 are, for example, touch panels. The communication device 306 is an interface for communicating with other devices.

A program executed by a computer is recorded as a file in an installable format or an executable format, in a computer-readable storage medium such as a CD-ROM, a memory card, a CD-R, and a Digital Versatile Disc (DVD).

Furthermore, the program executed by the computer may be provided while being stored on a computer connected to a network such as the Internet and downloaded via the network. Furthermore, the program executed by the computer may be configured to be provided or distributed over a network such as the Internet, without being downloaded.

Furthermore, the program executed by the computer may be configured to be provided by being embedded in advance in a ROM or the like.

The program executed by the computer has a module configuration including functional blocks that can also be implemented by a program, among the functional configurations (functional blocks) of the encryption device 10, the decryption device 20, and the key generation device 40 of the embodiment. As the actual hardware, each functional block is loaded onto the main storage device 302, with the control device 301 reading a program from a storage medium and executing the program. Thus, the above functional blocks are generated on the main storage device 302.

Note that some of or all the functional blocks described above may be implemented by hardware such as an Integrated Circuit (IC) instead of being implemented by software.

When implementing the functions using a plurality of processors, each processor may implement one of the functions, or may implement two or more of the functions.

Furthermore, the computer implementing the encryption device 10, the decryption device 20, and the key generation device 40 of the embodiment may operate in any appropriate mode. For example, the encryption device 10 (the decryption device 20, the key generation device 40) may be implemented by a single computer. Furthermore, for example, the encryption device 10, the decryption device 20, and the key generation device 40 may be operated as a cloud system on the network.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. An encryption device comprising instructions stored in a memory and one or more hardware processors executing the instructions to:

acquire a public key including a multivariable indeterminate equation $X(x_1, \ldots, x_l)$ and an identification polynomial $f(t)$, the multivariable indeterminate equation $X(x_1, \ldots, x_l)$ having, as coefficients, elements of a ring $F_p[t]/g(t)$ (where $F_p[t]$ represents a univariate polynomial ring on a finite field $F_p$ and $g(t)$ represents a modular polynomial);

disperse and embed a message m as coefficients of a plurality of plaintext polynomial factors $m_i(x_1, \ldots, x_l)$ (i=1, \ldots, k) having, as coefficients, polynomials with a limited degree among the elements of the ring $F_p[t]/g(t)$;

generate a plaintext polynomial $M(x_1, \ldots, x_l)$ by multiplying the plaintext polynomial factors $m_i(x_1, \ldots, x_l)$ (i=1, \ldots, k);

randomly generate a random polynomial $r(x_1, \ldots, x_l)$ having, as a coefficient, an element of the ring $F_p[t]/g(t)$;

randomly generate a noise polynomial $e(x_1, \ldots, x_l)$ having, as coefficients, polynomials with a limited degree among the elements of the ring $F_p[t]/g(t)$;

generate a ciphertext $c(x_1, \ldots, x_l)=E_{pk}(M,f,r,e;X)$ by executing encryption processing of performing an operation including at least one of adding, subtracting, and multiplying the identification polynomial $f(t)$, the random polynomial $r(x_1, \ldots, x_l)$, the noise polynomial $e(x_1, \ldots, x_l)$, and the multivariable indeterminate equation $X(x_1, \ldots, x_l)$ to, from, or by the plaintext polynomial $M(x_1, \ldots, x_l)$; and output, as an output of the encryption device, the ciphertext; and transmit, by the encryption device, the ciphertext to a decryption device.

2. The encryption device according to claim 1, wherein a degree ds of a solution of the multivariable indeterminate equation $X(x_1, \ldots, x_l)$ and a maximum value $d_m$ of a degree of the coefficients included in the plaintext polynomial factor $m_i(x_1, \ldots, x_l)$ (i=1, \ldots, k) satisfy $d_s \geq 1(d_m+1)$.

3. The encryption device according to claim 1, wherein a degree $d_f$ of the identification polynomial $f(t)$, the number $D_m$ of the plaintext polynomial factors $m_i(x_1, \ldots, x_l)$, a degree $d_s$ of a solution of the multivariable indeterminate equation $X(x_1, \ldots, x_l)$, and a maximum value $d_e$ of a degree of the coefficients included in the noise polynomial $e(x_1, \ldots, x_l)$ satisfy $d_f > D_m(d_s+d_e)$.

4. The encryption device according to claim 1, wherein a degree n of the modular polynomial $g(t)$, a degree $d_f$ of the identification polynomial $f(t)$, a total degree $D_X$ of the multivariable indeterminate equation $X(x_1, \ldots, x_l)$, a total degree $D^r$ of the random polynomial $r(x_1, \ldots, x_l)$, a degree $d_s$ of a solution of the multivariable indeterminate equation $X(x_1, \ldots, x_l)$, and a maximum value $d_e$ of a degree of the coefficients included in the noise polynomial $e(x_1, \ldots, x_l)$ satisfy $n > d_f + (D_x+D_r)d_s + d^e$.

5. A decryption device comprising instructions stored in a memory and one or more hardware processors executing the instructions to:

acquire a public key including a multivariable indeterminate equation $X(x_1, \ldots, x_l)$ and an identification polynomial $f(t)$, the multivariable indeterminate equation $X(x_1, \ldots, x_l)$ having, as coefficients, elements of a ring $F_p[t]/g(t)$ (where $F_p[t]$ represents a univariate polynomial ring on a finite field $F_p$ and $g(t)$ represents a modular polynomial);

acquire, as a private key, a zero point $u(x_1, \ldots, x_l) = (u_{x1}(t), \ldots, u_{xl}(t))$ of the multivariable indeterminate equation $X(x_1, \ldots, x_l)$;

generate a univariate polynomial $h(t)$ by substituting the zero point u into a ciphertext $c(x_1, \ldots, x_l)$;

obtain a univariate polynomial $\mu(t)$ as a remainder of division of the univariate polynomial $h(t)$ by the identification polynomial $f(t)$;

acquire a first factor by factorizing the univariate polynomial $\mu(t)$ on the finite field $F_p$;

obtain, by combining the first factor, a second factor resulting from substituting the zero point u into a factor of a plaintext polynomial that is a product of a plurality of plaintext polynomial factors $m_i(x_1, \ldots, x_l)$ ($i=1, \ldots, k$) having, as coefficients, polynomials with a limited degree among elements of the ring $F_p[t]/g(t)$;

restore the plaintext polynomial factor $m_i(x_1, \ldots, x_l)$ by
  deriving simultaneous linear equations by using the second factor and the zero point u, and
  solving the simultaneous linear equations;

extract a plaintext vector from the plaintext polynomial factors $m_i(x_1, \ldots, x_l)$ and decrypt a message m by calculating a product of elements of the plaintext vector;

extract an authenticator from the message m and verifies the authenticator; and output, as a decryption result, the message m for which the verification of the authenticator has succeeded, wherein the decryption device receives the ciphertext from an encryption device.

6. The decryption device according to claim 5, wherein
  the authenticator is calculated by performing a predetermined operation from encryption target data, and
  the message m includes the encryption target data and the authenticator.

7. An encryption program product comprising a non-transitory computer-readable recording medium on which an executable program is recorded, the program instructing a computer to:

acquire a public key including a multivariable indeterminate equation $X(x_1, \ldots, x_l)$ and an identification polynomial $f(t)$, the multivariable indeterminate equation $X(x_1, \ldots, x_l)$ having, as coefficients, elements of a ring $F_p[t]/g(t)$ (where $F_p[t]$ represents a univariate polynomial ring on a finite field $F_p$ and $g(t)$ represents a modular polynomial);

disperse and embed a message m as coefficients of a plurality of plaintext polynomial factors $m_i(x_1, \ldots, x_l)$ ($i=1, \ldots, k$) having, as coefficients, polynomials with a limited degree among the elements of the ring $F_p[t]/g(t)$;

generate a plaintext polynomial $M(x_1, \ldots, x_l)$ by multiplying the plaintext polynomial factors $m_i(x_1, \ldots, x_l)$ ($i=1, \ldots, k$);

randomly generate a random polynomial $r(x_1, \ldots, x_l)$ having, as a coefficient, an element of the ring $F_p[t]/g(t)$;

randomly generate a noise polynomial $e(x_1, \ldots, x_l)$ having, as coefficients, polynomials with a limited degree among the elements of the ring $F_p[t]/g(t)$;

generate a ciphertext $c(x_1, \ldots, x_l) = E_p k(M,f,r,e;X)$ by executing encryption processing of performing an operation including at least one of adding, subtracting, and multiplying the identification polynomial $f(t)$, the random polynomial $r(x_1, \ldots, x_l)$, the noise polynomial $e(x_1, x_l)$, and the multivariable indeterminate equation $X(x_1, \ldots, x_l)$ to, from, or by the plaintext polynomial $M(x_1, \ldots, x_l)$; and output, as an output of the encryption program product, the ciphertext; and transmit the ciphertext to a decryption device.

* * * * *